(12) United States Patent
Korpach et al.

(10) Patent No.: US 11,844,981 B2
(45) Date of Patent: Dec. 19, 2023

(54) GOLF BALL PLACEMENT SYSTEM AND A METHOD OF OPERATING THE SAME

(71) Applicant: ANK PARTNERS INC., Calgary (CA)

(72) Inventors: Arthur Neil Korpach, Calgary (CA); Sean Arthur Korpach, Calgary (CA)

(73) Assignee: ANK PARTNERS INC., Calgary (CA)

( * ) Notice: Subject to any disclaimer, the term of this patent is extended or adjusted under 35 U.S.C. 154(b) by 130 days.

(21) Appl. No.: 17/338,386

(22) Filed: Jun. 3, 2021

(65) Prior Publication Data

US 2021/0379445 A1 Dec. 9, 2021

Related U.S. Application Data

(60) Provisional application No. 63/035,522, filed on Jun. 5, 2020.

(51) Int. Cl.
*A63B 24/00* (2006.01)
*A63B 71/06* (2006.01)

(52) U.S. Cl.
CPC ...... *A63B 24/0021* (2013.01); *A63B 71/0622* (2013.01); *A63B 2024/0025* (2013.01);
(Continued)

(58) Field of Classification Search
CPC ............ A63B 24/0021; A63B 71/0622; A63B 2024/0025; A63B 2024/0028; A63B 2024/0043; A63B 2024/0056; A63B 2071/0638; A63B 71/04; A63B 60/46; A63B 69/3691; A63B 71/0619; A63B 2071/0641; A63B 2225/50; A63F 13/537; A63F 13/573; A63F 13/21; A63F 13/812;
(Continued)

(56) References Cited

U.S. PATENT DOCUMENTS 8,409,024 B2   4/2013   Marty et al.
9,132,345 B2   9/2015   Nicora et al.
(Continued)

FOREIGN PATENT DOCUMENTS

KR   101555840 B1 *   9/2015
KR   101555840 B1     9/2015

OTHER PUBLICATIONS

A. Umek et al.; "Suitability of Strain Gage Sensors for Integration into Smart Sport Equipment: A Golf Club Example"; Sensors, 2017, 17(4):916.
(Continued)

*Primary Examiner* — Jeffrey S Vanderveen
(74) *Attorney, Agent, or Firm* — Norton Rose Fulbright Canada LLP

(57) ABSTRACT

A golf system. The golf system includes a computing device associated with a user at a playing surface having at least one landmark object. The computing device includes a processor and a memory coupled to the processor. The memory may store processor-executable instructions that, when executed, configure the processor to: obtain topography data associated with a virtual golf hole for a virtual golf ball; determine a target destination location for the virtual golf ball on the playing surface based on the topography data and an anticipated virtual golf ball trajectory; and generating signals for communicating the target destination location and a ball placement location on the playing surface.

20 Claims, 17 Drawing Sheets

(52) U.S. Cl.
CPC ............... *A63B 2024/0028* (2013.01); *A63B 2024/0043* (2013.01); *A63B 2024/0056* (2013.01); *A63B 2071/0638* (2013.01)

(58) Field of Classification Search
CPC ............ A63F 13/5372; A63F 2300/306; A63F 2300/8011
See application file for complete search history.

(56) References Cited

U.S. PATENT DOCUMENTS

| | | | |
|---|---|---|---|
| 9,616,311 | B2 | 4/2017 | Nicora |
| 9,984,587 | B2 | 5/2018 | Shultz |
| 10,058,758 | B2 | 8/2018 | Coffman |
| 10,086,249 | B2 | 10/2018 | Nicora |
| 10,137,351 | B2 | 11/2018 | Coffman |
| 10,195,511 | B2 | 2/2019 | Dolige et al. |
| 10,486,047 | B2 | 11/2019 | Coffman |
| 11,308,821 | B2 * | 4/2022 | Pregizer ............... A63B 69/36 |
| 11,311,789 | B2 | 4/2022 | DeLeon et al. |
| 2002/0177490 | A1 | 11/2002 | Yong et al. |
| 2006/0105857 | A1 | 5/2006 | Stark |
| 2008/0293488 | A1 * | 11/2008 | Cheng ................. A63F 13/45 463/31 |
| 2010/0144456 | A1 | 6/2010 | Ahern |
| 2013/0085018 | A1 * | 4/2013 | Jensen ............... A63F 13/812 473/404 |
| 2016/0158640 | A1 * | 6/2016 | Gupta ............... A63F 13/812 463/3 |
| 2016/0325171 | A1 | 11/2016 | Niegowski |
| 2018/0290040 | A1 * | 10/2018 | Korpach ............. A63F 13/812 |
| 2019/0134506 | A1 * | 5/2019 | Gupta ............... G09B 19/0038 |
| 2019/0255407 | A1 * | 8/2019 | Rivas ................. A63F 13/812 |
| 2019/0255418 | A1 | 8/2019 | Seo |
| 2020/0004322 | A1 * | 1/2020 | Kudirka ............... G06T 13/40 |
| 2020/0013312 | A1 * | 1/2020 | Pregizer ............. A63B 24/0021 |

OTHER PUBLICATIONS

European Patent Office, Extended European Search Report dated Nov. 16, 2021 for European Application No. 21177733.9.

* cited by examiner

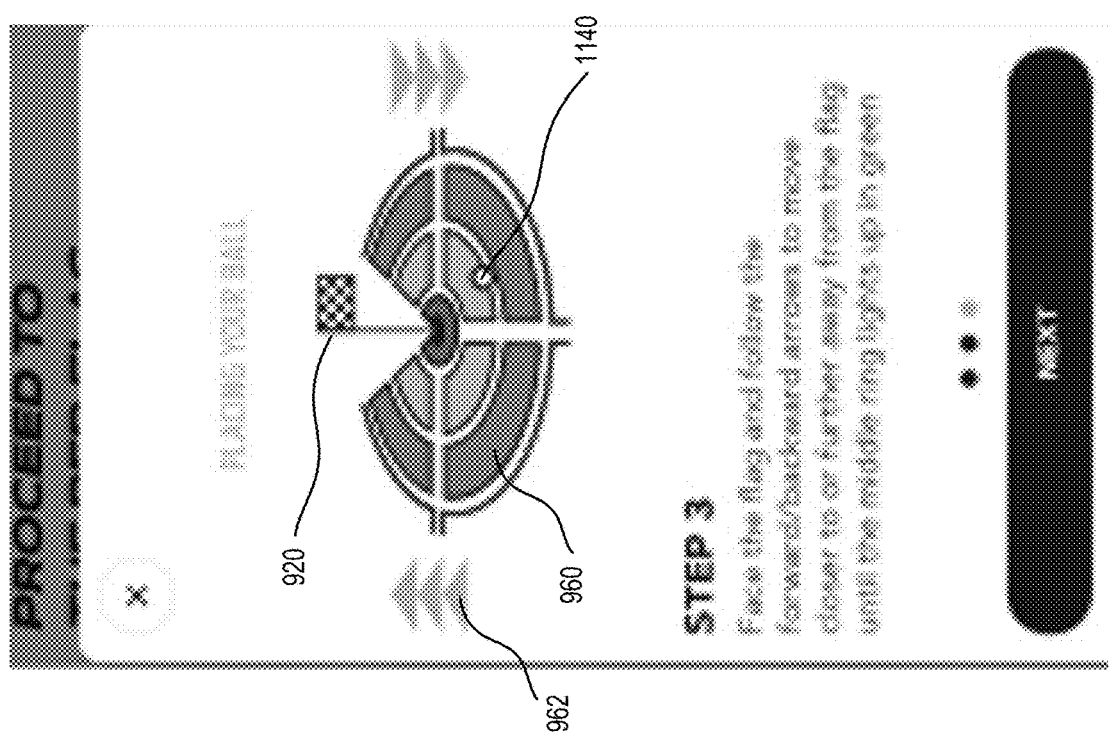

GOLF BALL PLACEMENT SYSTEM AND A METHOD OF OPERATING THE SAME

CROSS-REFERENCE TO RELATED APPLICATIONS

This application claims priority from U.S. provisional patent application No. 63/035,522, entitled "GOLF BALL PLACEMENT SYSTEM AND A METHOD OF OPERATING THE SAME", filed on Jun. 5, 2020, the entire contents of which are hereby incorporated by reference herein.

FIELD

Embodiments of the present disclosure generally relate to golf technology, and in particular to systems, devices, and methods of positioning a golf ball in a playing area.

BACKGROUND

On a golf putting green, a player strikes a golf ball with an intention of placing the golf ball into a target hole in as few strokes as possible. The putting green may be in a series of putting greens of a mini-golf course, a multi-hole golf course, or a virtual golf course. During competition, golf ball positioning relative to the target hole may be correlated with how easy or how challenging it may be to strike the golf ball into the target hole.

SUMMARY

The present disclosure describes embodiments of devices and methods for generating user interfaces for communicating ball placement locations on a playing surface for a golfing user. In some situations, the ball placement location may be a position on the playing surface at which a golf user is to replace a previously removed golf ball. In some situations, the ball placement location may be a position on the playing surface configured to emulate a virtual golf hole.

In some embodiments, devices may be configured to generate user interfaces having a substantially real-time image feed of the playing surface as the golf user traverses the playing surface (e.g., putting green). In some embodiments, the client may overlay direction interface elements atop the substantially real-time image feed to provide an augmented reality view of the playing surface.

In some embodiments, client devices may be configured to determine the ball placement location based on a selected target destination location (e.g., a golf hole). Client devices may be configured to select a target destination location on a playing surface having a plurality of destination locations based on correlating geometry of a virtual golf hole, surrounding features of the virtual golf hole, and/or attributes (e.g., surface characteristics including grass length, firmness, color, among other examples) of the virtual golf hole. In the present example, the playing surface may be for a virtual golf system.

In some scenarios, client devices may be configured to determine a target destination location to emulate a virtual golf ball position of a virtual golf hole based on topographical data of a golf hole and on an anticipated virtual golf ball trajectory.

By identifying the target destination location (e.g., target golf hole) based on topographical data representing an anticipated putting surface between the virtual golf ball and a virtual golf hole, the client device may not need to consider voluminous set of virtual golf hole characteristics, but only the portion of golf hole characteristics associated with the playing area along the anticipated golf ball trajectory. Such operations may reduce the computational requirements for determining the target destination location on the playing surface, and may lead to increased efficiencies associated with identifying a target golf hole on the playing surface.

In one aspect, the present disclosure describes a golf system. The golf system may include a computing device associated with a user at a playing surface having at least one landmark object. The computing device may include a processor and a memory coupled to the processor. The memory may store processor-executable instructions that, when executed, configure the processor to: obtain topography data associated with a virtual golf hole for a virtual golf ball; determine a target destination location for the virtual golf ball on the playing surface based on the topography data and an anticipated virtual golf ball trajectory; and generate signals for communicating the target destination location and a ball placement location on the playing surface In some embodiments, the playing surface may include a plurality of destination locations respectively associated with a landmark object, and determining the target destination location may include: identifying a subset of destination locations on the playing surface as a suitable target destination location; and determining the target destination location from the subset of destination locations based on topography data portions associated with the anticipated golf ball trajectory for emulating the virtual golf hole.

In some embodiments, the determined target destination location may be based on optimizing at least one of: a number of golf users playing a golf ball at respective destination locations on the playing surface, playing surface wear pattern, or flow of golf users into and away from the playing surface.

In any of the above embodiments, the topography data may include virtual boundary data relative to a virtual target destination location associated with the virtual golf hole.

In any of the above embodiments, generating signals for communicating the target destination location and the ball placement location on the playing surface may include: displaying a direction interface element for overlaying on image data including a landmark object proximal to the target destination location for guiding the user to the ball placement location, the direction interface element generated based on anchor data associated with the landmark object and a current user location.

In some embodiments, the direction interface element may be based on a polar coordinate system providing annular direction centered about the landmark object and a displacement direction in a radial direction based on the landmark object.

In some embodiments, the overlay of the direction interface element atop the substantially real-time image feed at the computing device may provide an augmented reality view of the playing surface as the user traverses the playing surface.

In some embodiments, generating signals for communicating the target destination location and the ball placement location on the playing surface may include: in response to obtaining an updated user location relative to the landmark object, display an updated interface element to provide subsequent direction towards the ball placement location.

In some embodiments, wherein the current user location may be based on at least one of a location of the computing device being proximal to the user or a location of a tracking device wearable by the user.

In some embodiments, the location of the tracking device may be based on one or more sensors positioned at known locations on the playing surface.

In any of the above embodiments, the landmark object may include at least one of a flag pin or an object at a fixed location proximal to the target destination location at the playing surface.

In another aspect, a method for a golf system including a computing device associated with a user at a playing surface having at least one landmark object is provided. The method may include: obtaining topography data associated with a virtual golf hole for a virtual golf ball; determining a target destination location for the virtual golf ball on the playing surface based on the topography data and an anticipated virtual golf ball trajectory for emulating the virtual golf hole; and generating signals for communicating the target destination location and a ball placement location on the playing surface.

In some embodiments, the playing surface may include a plurality of destination locations respectively associated with a landmark object, and determining the target destination location may include: identifying a subset of destination locations on the playing surface as a suitable target destination location; and determining the target destination location from the subset of destination locations based on topography data portions associated with the anticipated golf ball trajectory for emulating the virtual golf hole.

In some embodiments, the determined target destination location may be based on optimizing at least one of: a number of golf users playing a golf ball at respective destination locations on the playing surface, playing surface wear pattern, or flow of golf users into and away from the playing surface.

In any of the above embodiments, generating signals for communicating the target destination location and the ball placement location on the playing surface may include: displaying a direction interface element for overlaying on image data including a landmark object proximal to the target destination location for guiding the user to the ball placement location, the direction interface element generated based on anchor data associated with the landmark object and a current user location.

In some embodiments, the direction interface element may be based on a polar coordinate system providing annular direction centered about the landmark object and a displacement direction in a radial direction based on the landmark object.

In some embodiments, the overlay of the direction interface element atop the substantially real-time image feed at the computing device may provide an augmented reality view of the playing surface as the user traverses the playing surface.

In some embodiments, generating signals for communicating the target destination location and the ball placement location on the playing surface may include: in response to obtaining an updated user location relative to the landmark object, display an updated interface element to provide subsequent direction towards the ball placement location.

In some embodiments, wherein the current user location may be based on at least one of a location of the computing device being proximal to the user or a location of a tracking device wearable by the user.

In another aspect, a golf system is provided. The golf system may include a computing device associated with a user at a playing surface having at least one landmark object. The computing device may include a processor and a memory coupled to the processor. The memory may store processor-executable instructions that, when executed, configure the processor to: obtain a target destination for the virtual golf ball on the playing surface; display a direction interface element for overlaying on image data including a landmark object proximal to the target destination location for guiding the user to a ball placement location, the direction interface element generated based on anchor data associated with the landmark object and a current user location; and in response to obtaining an updated user location relative to the landmark object, display an updated interface element to provide subsequent direction towards the ball placement location. The overlay of the direction interface element atop a substantially real-time image feed at the computing device may provide an augmented reality view of the playing surface as the user traverses the playing surface.

In some embodiments, the direction interface element may be based on a polar coordinate system providing annular direction centered about the landmark object and a displacement direction in a radial direction based on the landmark object.

In some embodiments, the current user location is based on at least one of a location of the computing device being proximal to the user or a location of a tracking device wearable by the user.

In some embodiments, the location of the tracking device is based on one or more sensors positioned at known locations on the playing surface.

In any of the above embodiments, the landmark object includes at least one of a flag pin or an object at a fixed location proximal to the target destination location at the playing surface.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 9A, 9B, 10A, 10B, and 11 illustrate graphical user interfaces for dynamically guiding a user to a target ball placement location, in accordance with another embodiment of the present disclosure;

DETAILED DESCRIPTION

Figure 1:
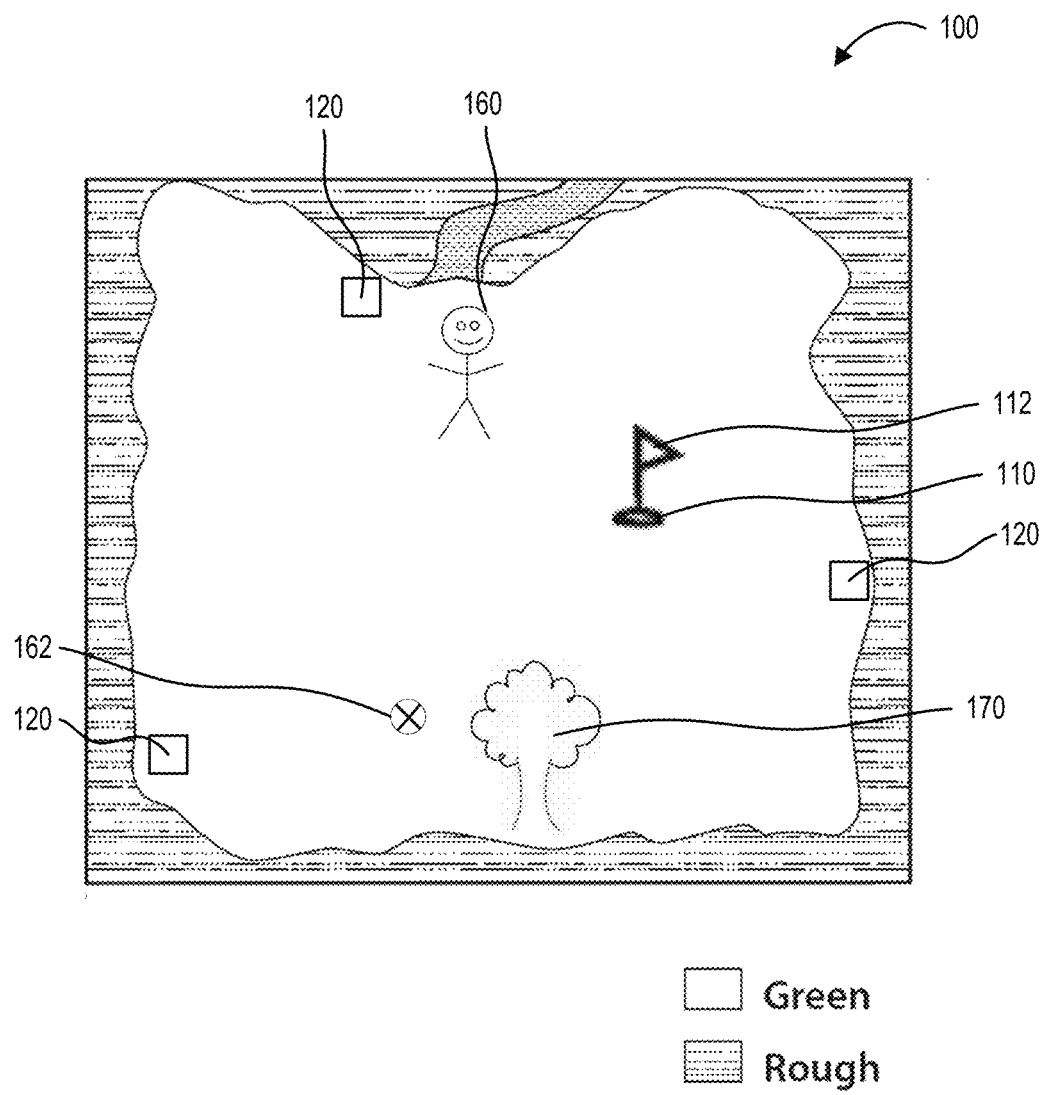
FIG. 1 illustrates a plan view of a putting green of a golf hole, in accordance with an embodiment of the present disclosure.

The present disclosure describes embodiments of devices and methods of a golf system. The golf system may include devices for providing direction or guidance to a user for positioning a golf ball at a ball placement location on a playing surface. In some examples, the playing surface may be a putting green having a target hole towards which a player may strike a golf ball.

A golf putting green may be an area having relatively short grass. A player may utilize a putter (e.g., a specialized golf club) to strike a golf ball into the target hole. In some situations, the positioning of the golf ball relative to the target hole or relative to surrounding terrain characteristics may be correlated with how a difficultly level associated with striking the golf ball into the target hole. For example, it may be relatively easier to strike a golf ball into the target hole when the golf ball is positioned nearer to the target hole. In another example, it may be relatively easier to strike a golf ball into the target hole when the golf ball is positioned on relatively flat terrain having short grass as compared to the golf ball being positioned on a putting surface or fringe area having thicker or longer grass.

In some situations, it may be an act of courtesy for a golfer to pick up a golf ball from the putting green of a golf hole to avoid obstructing putts of other players. For example, during play, once golf balls of respective golfers have reached a putting green, a player having their ball furthest from the golf hole may be the first player to play the putt. The remaining players may pick up their respective golf balls from the putting green. In some examples, golf ball positions may be marked using ball markers, such as a coin-shaped marker placed atop the putting green. The ball markers may protrude from the surface of the putting green, and present a visual distraction or physical obstacle to respective players. In situations where ball markers may obstruct a players putt, the ball markers may be re-located by a golf club/putter head length or two lengths, or other operation. Operations for replacing the ball at the original location may be subject to unintentional placement at a location that may be offset from the original location.

As positioning of a golf ball on the golf green may be correlated with relative ease or relative chance of a player being able to subsequently strike the golf ball into the target hole, devices and methods of tracking golf ball position and, subsequently, providing direction for placing the golf ball at a substantially similar golf ball position may be beneficial.

In some embodiments, the playing surface may be one of a plurality of playing surfaces for a virtual golf system. The virtual golf system may include a plurality of target/striking area pairs, such as a tee shot target/striking area, an approach shot target/striking area, a pitching target/striking area, and a putting area. As will be described, the respective target/striking area pairs may be associated with a different range of distances.

In some embodiments of the virtual golf system, a player may be playing a virtual 9-hole golf course. As an example, the virtual golf system may provide the plurality of target and striking areas, such that the player may successively hit a plurality of tee shots of the 9 virtual golf holes. The player may then successively hit approach shots of the respective 9 virtual golf holes. Further, the player may subsequently successively hit chip shots for the respective 9 virtual golf holes. To finish the round of 9 golf holes, the player may play numerous putts on a putting area for the respective 9 virtual golf holes. An example of such a virtual golf system is described in the disclosure of U.S. Pat. No. 11,013,976, the entirety of which is incorporated herein by reference.

It may be beneficial to provide devices and methods for providing direction to the respective golfers for placing a golf ball on the physical putting areas based on a virtual golf ball location for the respective 9 virtual golf holes so as to emulating virtual golf holes.

Reference is made to FIG. 1, which illustrates a plan view of a putting green 100 of a golf hole, in accordance with an embodiment of the present disclosure. The putting green 100 may be a playing surface having a target destination location 110. Respective players may strike their golf ball onto the putting green 100 (e.g., approach shot). For instance, a player 160 may have struck their golf ball onto the putting green 100, subsequently stopping at a ball placement location 162. Once the golf ball reaches the putting green 100, the player may strike (e.g., putt) their golf ball from the ball placement location 162 to advance the golf ball towards the target destination location 110.

The putting green 100 may have varied terrain. For instance, the putting green 100 may have varying sloped terrain or undulation across the playing surface. In some situations, positioning a golf ball at a position that may be a few inches away from the true ball placement location 162 may result in a relatively easier or more challenging putt to the target destination location 110, thereby affecting the number of strokes the player 162 would register on the golf hole.

In situations where the player 160 may need to pick up their golf ball and, at a subsequent time, place their golf ball back at the placement position 162, it may be desirable to provide devices and methods for tracking the ball placement location 162 for the respective players and for subsequently guiding the respective players to their respective ball placement locations 162.

In some embodiments, the putting green 100 may include a golf ball positioning system installed therein. As will be described in the present disclosure, the golf system may include the playing surface, such as the putting green 100 and at least one landmark object associated with a target destination location 110 on the playing surface. In some embodiments, landmark objects may include a flag pole 112, a tree 170, or other readily identifiable objects. In some embodiments, the landmark objects may include one or more sensors 120 positioned about the playing area for detecting tracking devices associated with a user (e.g., a golfer). The embodiments of landmark objects may be positioned at fixed or known positions about the playing surface, and may be configured as a common frame of reference to correlate a virtual location and a physical location at the playing surface.

In some embodiments, the golf system may determine a position of the player 160 on the putting green 100 based on detected position data associated with one or more devices of the player 160. For example, the golf system may determine the position of the player 160 based on a wearable tracking device worn by the user, such as on the user's wrist, waist, ankle, head, or the like, or based on a tracking device affixed to a golf club. In some examples, the golf system may determine the position of the player 160 based on location data associated with a client device carried by the player 160. The client device may be a mobile device, such as a smartphone device, a tablet device, or the like. Other tracking device types associated with the player 160 may be used for identifying a position of the player 160 on the putting green 100.

In some embodiments, the golf system may determine the position of the player 160 based on sensor data retrieved from the one or more sensors 120 positioned about the playing surface. The one or more sensors 120 may be line-of-sight sensors, such as infrared sensors or other types of short-range communication sensors. Sensor data from the combination of sensors 120 may be used to determine a position of the player 160 based on triangulation or similar operations. In some embodiments, the one or more sensors 120 may be passive sensors configured as landmark objects. For example, the one or more sensors 120 may be landmark objects that may provide visual reference points for devices conducting operations based on augmented reality.

In embodiments of a virtual golf system, the flag pole 112 may be among a plurality of flag poles on a putting surface. The respective flag poles may include a distinct identifier, such as a distinctive color or other distinctive text (e.g., a number, etc.), and may be configured to provide a common frame of reference for providing physical directions to a ball placement position proximal to a target destination location (e.g., golf hole) for a virtual golf hole.

Figure 2:
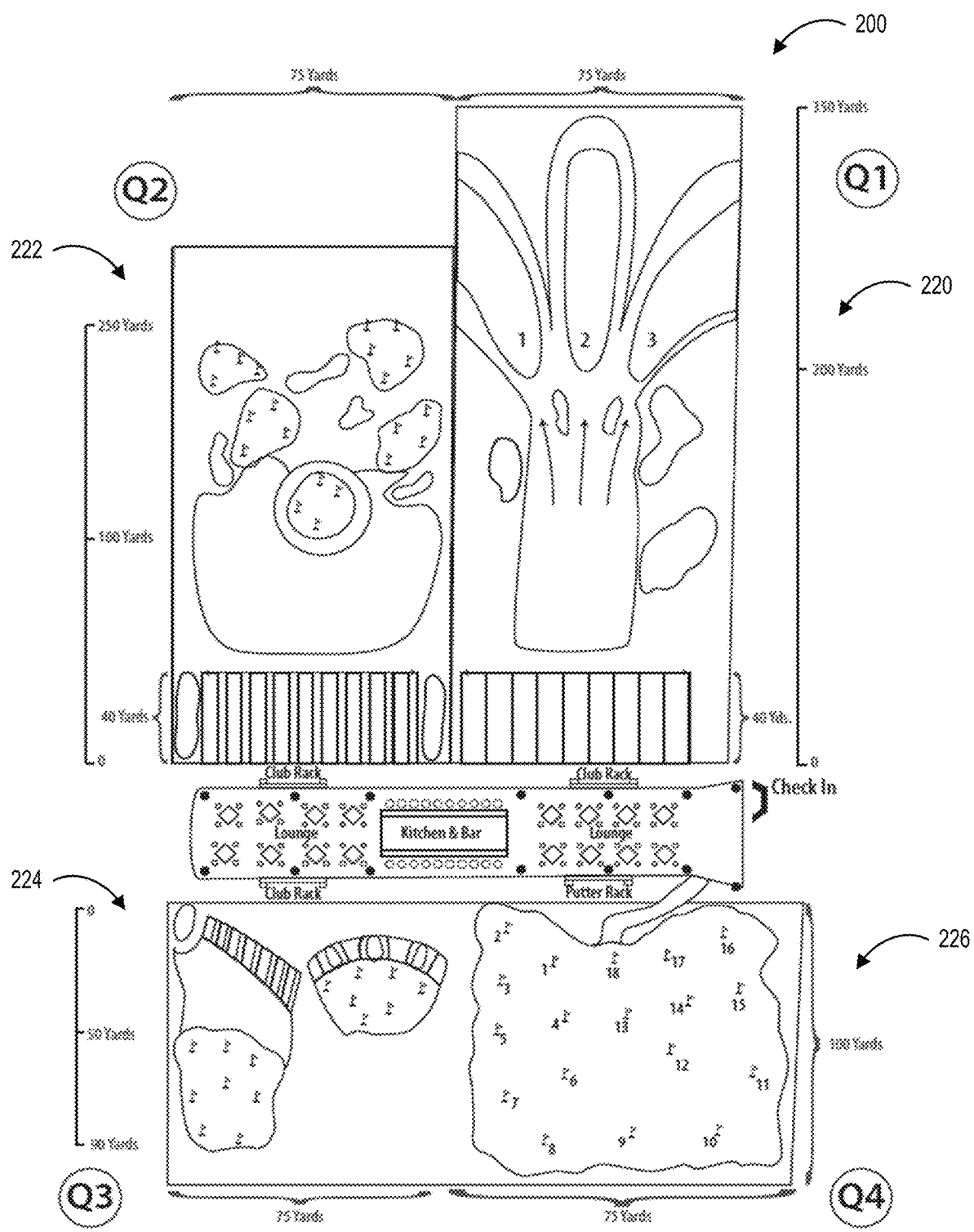
FIG. 2 illustrates a top plan view of a virtual golf system, in accordance with embodiments of the present disclosure.

Reference is made to FIG. 2, which illustrates a top plan view of a virtual golf system 200, in accordance with embodiments of the present disclosure. The virtual golf system 200 may include a plurality of target/striking area pairs.

For example, the virtual golf system 200 may include a tee shot target area/striking area, generally identified with reference numeral 220. The virtual golf system 200 may include an approach shot target area/striking area, generally identified with reference numeral 222, and a chip shot target area/striking area, generally identified with reference numeral 224. The respective target area/striking areas may be associated with different distance ranges.

The virtual golf system 200 may facilitate a virtual golf game. For example, respective players may play a virtual 9-hole golf course. The players may successively hit all tee shots of the virtual 9-hole golf course, subsequently hit all approach shots of the respective 9 virtual golf holes, and further subsequently hit chip shots for the respective 9 virtual golf holes. To finish the round of 9 golf holes, the player may play numerous putts on a putting area 226 for the respective 9 virtual golf holes. An example of such a virtual golf system is described in the disclosure of U.S. Pat. No. 11,013,976.

In the present example, the putting area 226 may include a plurality of golf holes and associated pin flags. In FIG. 2, the plurality of golf holes may be identified by numbers from 1 to 8. In some embodiments, the putting area 226 may be configured with varied terrain (e.g., slopes, characteristics, etc.) and may be associated with varying distance ranges (e.g., for short 5 foot putts, 30 foot putts, etc.). It may be beneficial to provide devices and methods configured to provide players with guidance towards ball placement locations for the respective putts of the 9 virtual golf holes.

In some embodiments, the putting area 226 may include a plurality of golf holes to simultaneously accommodate a plurality of players. In some embodiments, a virtual golf ball position may be correlated with one or a plurality of the 18 example golf holes for emulating the virtual golf hole. As an illustrating example, a putt for virtual golf hole number 1 may be represented by a ball placement position proximal to any one of the golf holes identified by the numerical identifier 9, 10, or 12. Accordingly, the system may be configured to optimize putting surface usage by numerous players by emulating virtual golf holes on the physical putting area 226 based on any number of golf holes. As will be described in the present disclosure, in some embodiments, the system may determine ball placement locations for a player based on a topography of the virtual golf hole and an anticipated virtual golf ball trajectory for emulating the virtual golf hole on the physical putting area 226. An anticipated virtual golf ball trajectory may include an estimated or expected ball path along a putting area/golf green from a ball placement location and a target destination location (e.g., golf hole). In the present example, the virtual golf system 200 may determine a virtual location of a virtual golf ball on a virtual golf hole based on sensing devices configured to sense the travel of a physical golf ball struck from respective striking areas of the virtual golf system. In some embodiments described herein, golf systems may be configured to determine a physical ball placement location based on the virtual location of the virtual golf ball and spatial anchor data associated with a physical playing surface.

Figure 3:
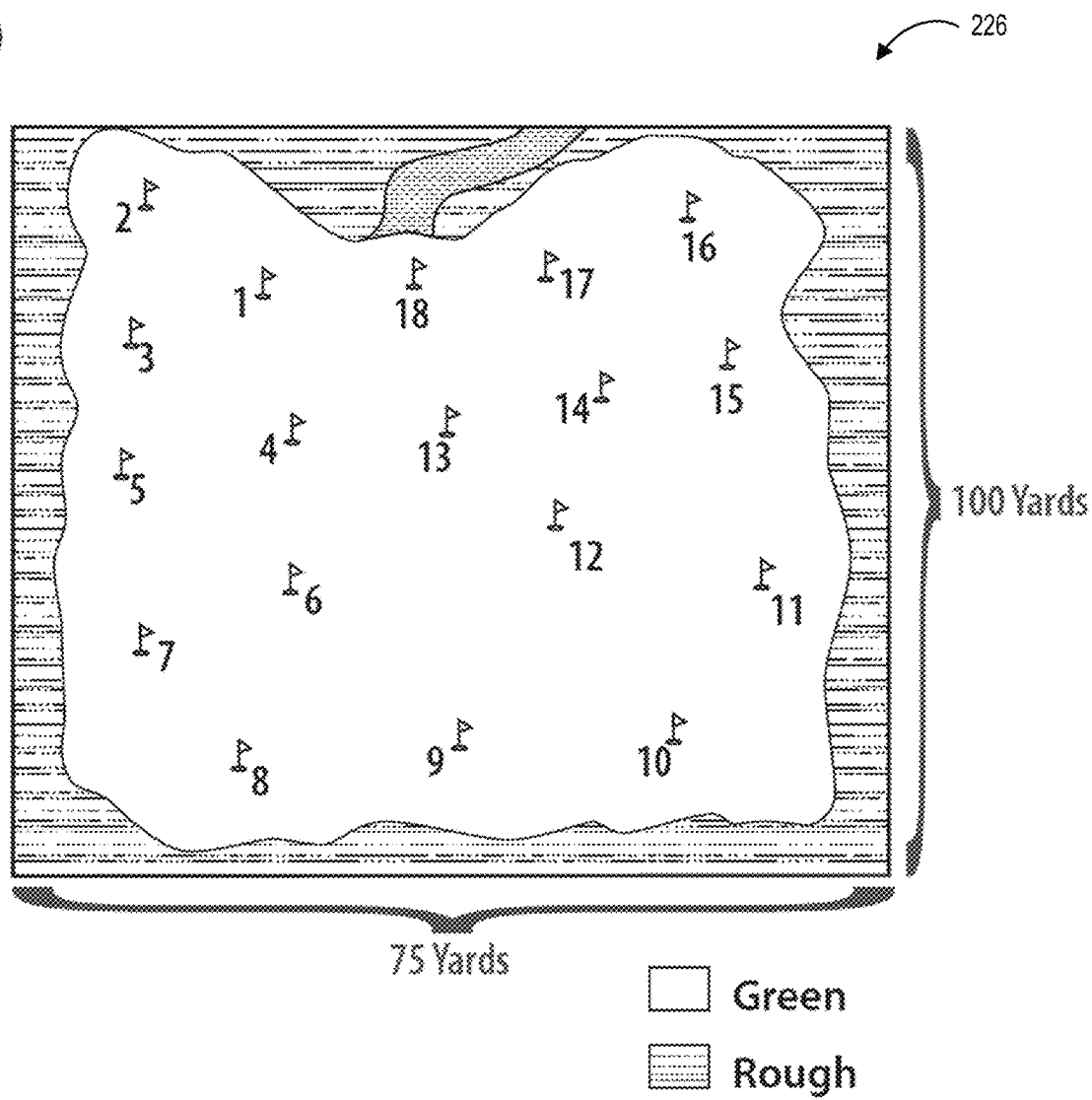
FIG. 3 illustrates a top plan view of the putting area of FIG. 2.

Reference is made to FIG. 3, which illustrates a plan view of the putting area 226 of FIG. 2. The putting area 226 may be a playing surface having a plurality of golf holes representing target destination locations for golf balls. The respective golf holes may be associated with at least one landmark object. In some embodiments, a landmark object may be a flag pin having a distinctive color or having distinctive insignia. In some embodiments, landmark objects may be other objects at fixed or known positions on the putting area 226.

In some embodiments, the putting area 226 may be configured to emulate a plurality of virtual golf holes for one or more players. As the putting area 226 may include a plurality of golf holes, the system may be configured to provide direction to and accommodate a plurality of simultaneous players playing respective putt shots for a virtual golf hole.

In some embodiments, more than one golf hole and associated flag pin (e.g., flag represented by numbers 6, 7, 8, or 9) may be configured to emulate a 10 foot putt with a relatively flat terrain. The system may be configured to optimize usage of the putting area 226 by directing players to ball placement locations relative to landmark objects for maximizing usage of the putting area 226. In some embodiments, the system may be configured to minimize uneven playing surface wear across the putting area 226 by directing players to ball placement locations in a way so as to evenly distribute foot traffic.

In some embodiments, the system may include a client device associated with a player for interacting with at least one landmark object, such as a flag bin. The player may operate the client device while traversing the putting area 226.

In some embodiments, the client device may be a smartphone device, a tablet device, a wearable computing device, or the like, and may be configured to track a location of the player on the putting area 226 based on GPS tracking operations or other location tracking operations. By tracking the location of the player on the putting area 226, the client device may provide directional guidance to the player for placing a golf ball at a ball placement location for emulating a virtual golf hole for a putt.

In some embodiments, the client device may include an image capture device. When the player holds the client device in a direction of the ball placement location, the client device may be configured to display a substantially real-time video feed showing a field of view of the putting area 226. In some embodiments, the client device may be configured to overlay graphical interface elements on the substantially real-time video feed for providing augmented reality-based direction and feedback to guide the player to a target ball placement location.

As will be described, the respective golf holes or landmark objects may be associated with spatial anchor data for providing a common frame of reference among the physical putting area 226 and a virtual golf hole of a virtual golf system.

Figure 4:
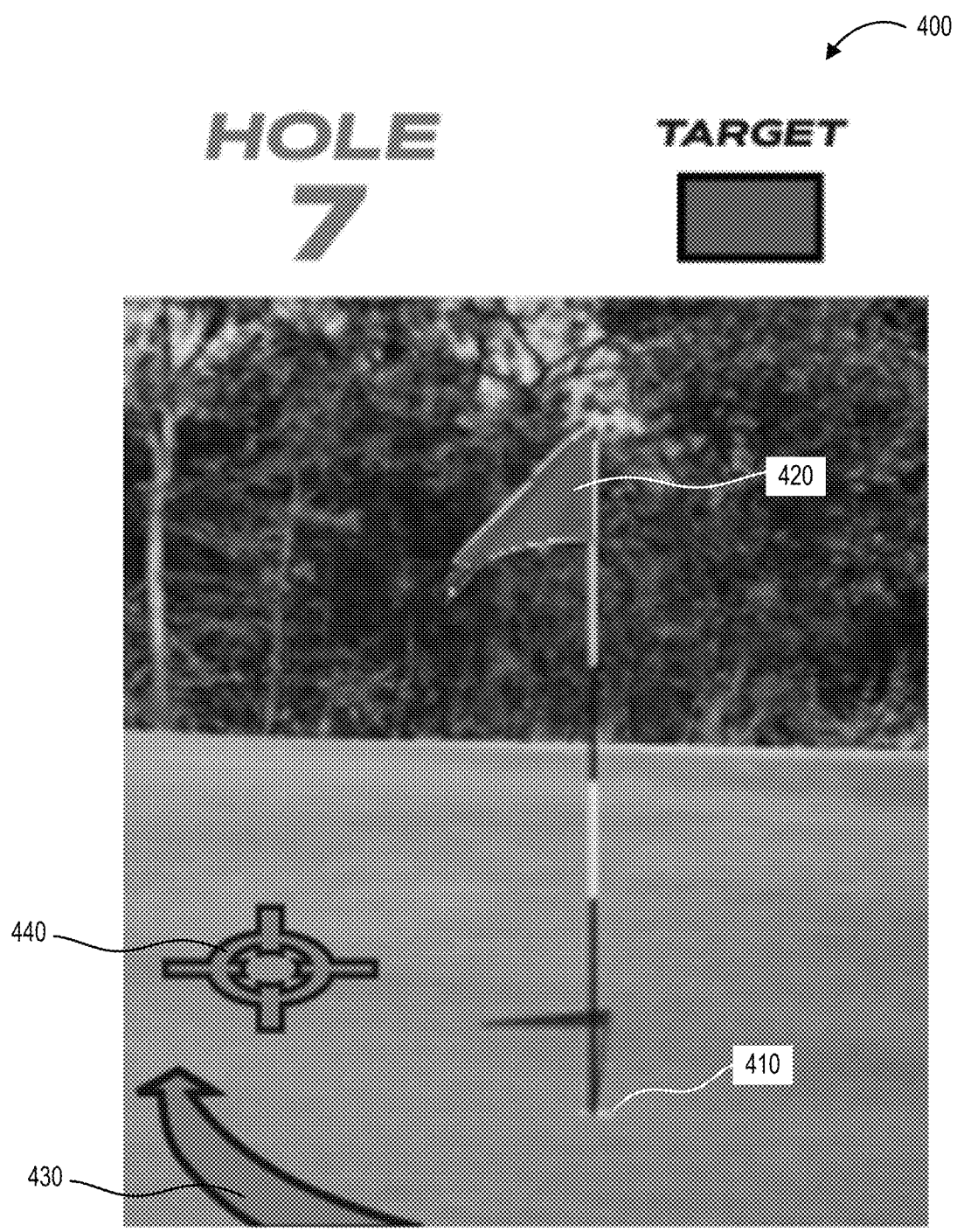
FIG. 4 illustrates a graphical user interface illustrating overlaid graphical interface elements on an image feed at a client device, in accordance with an embodiment of the present disclosure.

Reference is made to FIG. 4, which illustrates a graphical user interface 400 illustrating overlaid graphical interface elements on an image feed at a client device, in accordance with an embodiment of the present disclosure. The graphical user interface 400 illustrates a target destination location 410 (e.g., golf hole) and an associated landmark object 420. In FIG. 4, the landmark object 420 may be a flag pin positioned atop the golf hole. The landmark object 420 may have a distinctive indicia, such as a distinctive color relative to other landmark objects on the golf course or distinctive indicia including logos or text.

As the player holds the client device while walking towards the golf hole, the client device may display a substantially real-time image feed on a display screen. The graphical user interface includes a substantially real-time image feed a camera field of view. The real-time image feed may show the golf hole (e.g., target destination location) and the landmark object 420 (e.g., flag pin).

The graphical user interface 400 may include an overlay of direction interface elements 430, such as arrows for directing the player towards areas on the putting green. In some embodiments, the graphical user interface 400 may include an overlay of an indicia 440 showing a target ball placement location. The target ball placement location may be associated with a physical location on the putting green for emulating a virtual golf hole for the player. In some situations where a player may pick up their golf ball as a courtesy to other players on the golf green (e.g., to reduce visual distraction during putts), the target ball placement location may be associated with a physical location from which a golf ball was picked up from and, subsequently, where the golf ball shall be replaced for the player to continue play.

In some embodiments, in response to detecting that the client device location is changing relative to the landmark object, the client device may dynamically display updated interface elements to provide subsequent direction towards the ball placement location.

Figure 5:
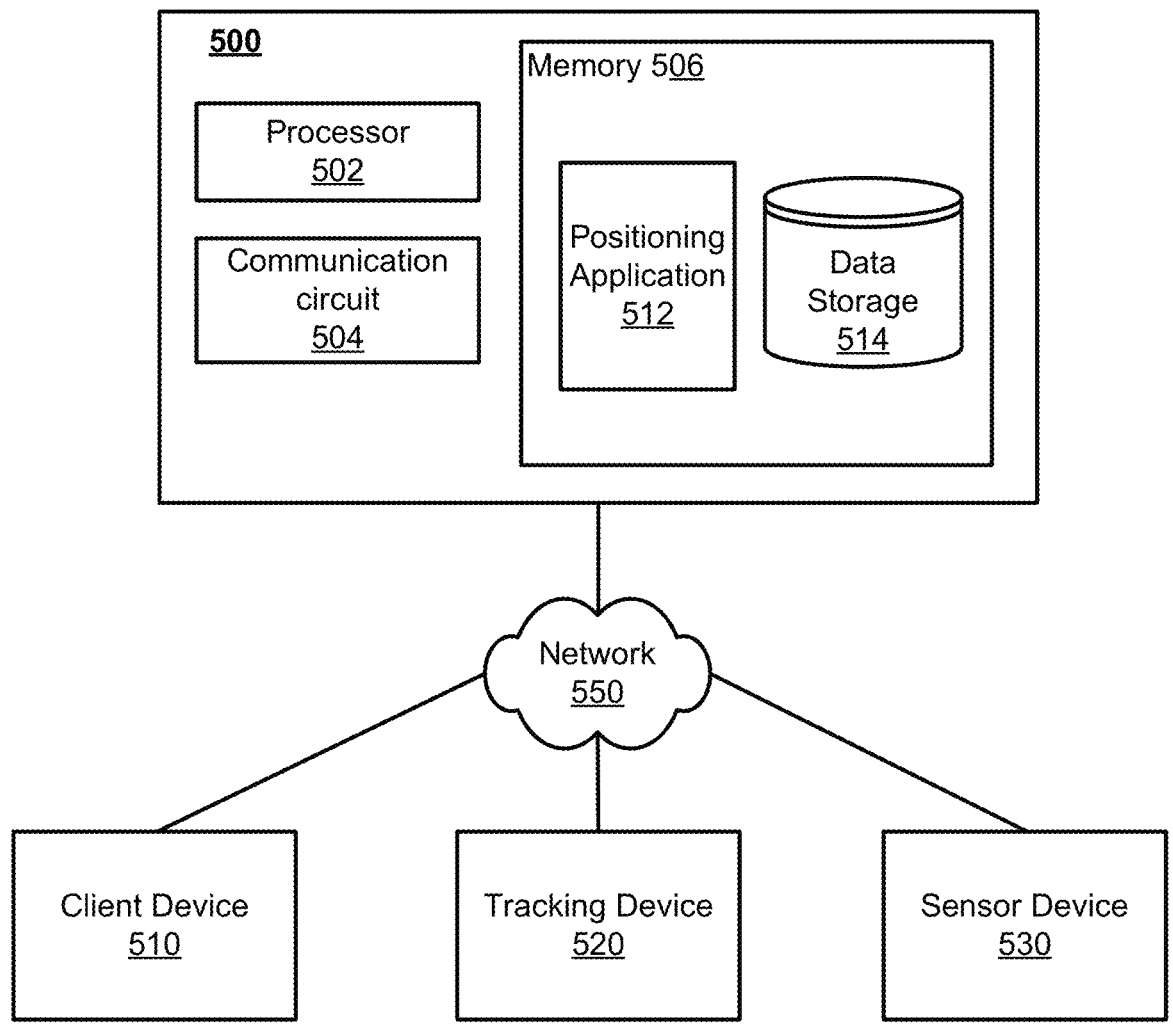
FIG. 5 illustrates a golf system, in accordance with an embodiment of the present disclosure.

Reference is made to FIG. 5, which illustrates a system 500, in accordance with an embodiment of the present disclosure. The system 500 may be associated with a physical golf course or a virtual golf course, and may be configured to track golfers and associated golf balls of golfers during play.

The system 500 may transmit and/or receive data messages via a network 450 to/from a client device 510, a tracking device 520, or a sensor device 530. The network 550 may include a wired or wireless wide area network (WAN), local area network (LAN), a combination thereof, or the like. In some embodiments, network communications may be based on HTTP post requests or TCP connections. Other network communication operations or protocols may be contemplated.

The system 500 includes a processor 502 configured to implement processor readable instructions that, when executed, configure the processor 502 to conduct operations described in the present disclosure. For example, the system 500 may be configured to conduct operations for generating or storing anchor data associated with target destination locations, landmark objects, ball placement locations, or other features of the golf system.

In some embodiments, the system 500 may be configured for operations of a virtual golf system or for generating direction interface elements for overlaying on image data at a client device for guiding players to ball placement locations on playing surfaces of a golf course.

The system 500 may include a processor 502. The processor 502 may be a microprocessor or microcontroller, a digital signal processing processor, an integrated circuit, a field programmable gate array, a reconfigurable processor, or combinations thereof.

The system 500 includes a communication circuit 504 to communicate with other computing devices, to access or connect to network resources, or to perform other computing applications by connecting to a network (or multiple networks) capable of carrying data. In some embodiments, the network 550 may include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combination of these. In some examples, the communication circuit 504 may include one or more busses, interconnects, wires, circuits, and/or any other connection and/or control circuit, or combination thereof. The communication circuit 504 may provide an interface for communicating data between components of a single device or circuit.

The system may include memory 506. The memory 506 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 506 may be storage media, such as hard disk drives, solid state drives, optical drives, or combinations thereof.

The memory 506 may store a positioning application 512 including processor readable instructions for conducting operations described herein. In some examples, the positioning application 512 may include operations for generating and storing anchor data associated with target destination locations of golf holes.

Anchor data may be spatial anchor data for a common frame of reference among physical location data and virtual location data for providing augmented reality output. As an illustrating example, spatial anchor data may be generated based on operations by a Microsoft Azure™ spatial anchor platform.

The system 500 may include a data storage 514. In some embodiments, the data storage 514 may be a secure data store. In some embodiments, the data storage 514 may store virtual positioning data associated with a coordinate system for orienting objects in three-dimensional space relative to known reference points, transform data for transforming virtual position data into physical position data associated with topographical data associated with the playing area, or other data associated with operations described in the present disclosure.

For example, the data storage 514 may store spatial anchor data, such that one or more of the client devices 510 may retrieve the spatial anchor data for conducting operations of augmented reality features described in the present disclosure. In some embodiments, spatial anchor data may be associated with anchor identifiers, and may be associated with target destination locations on a playing surface.

The client device 510 may be a computing device including a processor, memory, or a communication interface, similar to the example processor, memory, or communication interfaces of the system 500. In some embodiments, the client device 510 may be a computing device such as a smartphone device, a tablet device, a wearable computing device, or the like, and may be associated with a local area network.

The client device 510 may be connected to the local area network and may transmit one or more data sets to the system 500. In some embodiments, the client device 510 may be configured to provide one or more prompts for guiding the player towards a physical ball placement location for placing a golf ball. In some embodiments, the client device 510 may be configured with a display for displaying an overlay of direction interface elements associated with directions (e.g., move left, move right, move forward, move backwards, etc.). In some examples, the one or more prompts may be visual prompts via a graphical user interface. In some examples, the one or more prompts may be audible prompts via a loudspeaker device. In some examples, the one or more prompts may be haptic feedback prompts via vibrational alerts or other tactile-based alerts.

The system may include one or more tracking devices 520. The tracking devices 520 may be associated with users or objects that may be tracked within a golfing area. In some embodiments, the one or more tracking devices 520 may be wearable computing devices, a wrist bracelet including unique identifying features (e.g., unique bar code features, etc.), or other object responsive to sensor devices 530 and that may be affixed to a user or object to be tracked. In some embodiments, the tracking device 520 may be worn by the user on any other portion of their body, such as the user's leg, the user's torso, or the like. In some embodiments, the system 200 may determine a position of the one or more tracking devices 520 based on sensor data identifying the one or more tracking devices 520.

In some embodiments, a tracking device 520 may be a wearable bracelet worn on a user's wrist. The wearable bracelet may be worn on the user's wrist associated with the hand most often used to place a golf ball onto a putting green. For instance, for a right-handed golfer accustomed to placing a golf ball onto the putting green with their right hand, the tracking device 520 may be worn on the user's right-hand wrist. In some embodiments, a determined trajectory path including instructions for guiding the user from the user position to the physical ball placement location may be based on an identified position of the tracking device 520. In some embodiments, the tracking device 520 may be configured to be worn by the user such that the tracking device 520 may not slide or change positions on the user's wrist.

In some embodiments, the one or more sensor devices 530 may be at least one of a ultrasonic sonar sensor, an infrared sensor, radio frequency identification technology, near-field communication sensor, image sensor, or other sensors for identifying objects within the sensing field of the sensor devices 530.

In some embodiments, the system 500 may determine a user or object position based on one or more sensor devices 530 detecting a tracking device 520 proximal to or within the playing surface. In some embodiments, the system 500 may determine a user or object position based on receiving, via the network 550, position data from the tracking device 520. In the present example, the tracking device 520 may include global positioning system components for identifying position data associated with the tracking device 520, and the tracking device 520 may transmit the position data to the system 500. Other methods of determining a user or object position within the playing area may be contemplated.

In some embodiments, the tracking device 520 may be a substantially standalone wearable computing device that may be identified by the one or more sensor devices 530 or that may be configured to transmit and/or receive, via the network 550, data sets associated with position data or trajectory data to the system 500.

In some embodiments, prior to deployment for determining location data associated with tracking devices 520, the system 500 may be initialized by conducting operations for calibrating location data of sensor devices 530 or other landmarks within the playing area. The location data of the sensor devices 530 or other landmarks may be associated with topographical data associated with one or more golf holes (e.g., physical environment). In some embodiments, at the beginning of a golfing season, the system 200 may conduct calibration operations for mapping physical elements of the golf course and storing the mapped elements as golf course data defining topographical data. For instance, the position of sand traps, tee boxes, or putting greens may be shifted from season to season. Accordingly, the system 500 may conduct operations to map the physical elements of the golf course, and the system 500 may subsequently map the physical elements to a virtual golf course or virtual placement positions.

In some embodiments, identified or obtained location data from client devices 510, tracking devices, or sensor devices 530 may be used during transform operations for correlating virtual position data with physical ball placement location data among different spatial coordinate spaces.

In some embodiments, one or more client devices 510 may be used for generating spatial anchor data associated with the physical playing surface, such as the putting area 226 (FIG. 3). Spatial anchor data may be associated with landmark objects on the putting area 226, and may be associated with a common frame of reference for correlating physical features of the putting area 226 and virtual golf hole features. In some embodiments, spatial anchor data may include anchor identifiers for correlating with landmark objects, visual data such as image frames generated during spatial anchor data generation operations, and the like. Accordingly, the one or more client devices 510 may be configured to generate spatial anchor data at the beginning of a golf course season or at such time that a target destination location (e.g., golf hole) or a landmark object may be re-positioned.

Figure 6B:
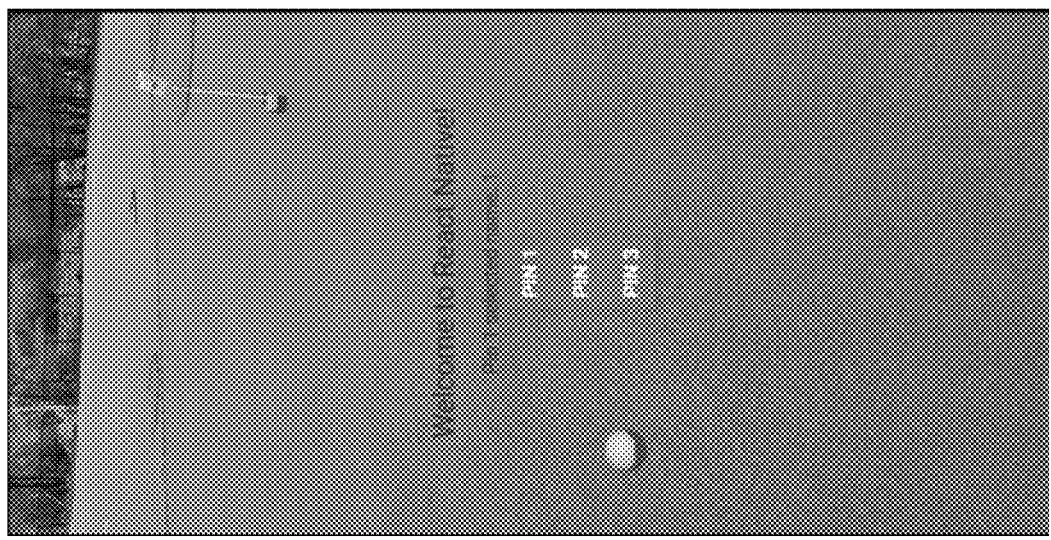
FIGS. 6A and 6B illustrate user interfaces, in accordance with embodiments of the present disclosure.
Figure 6A:
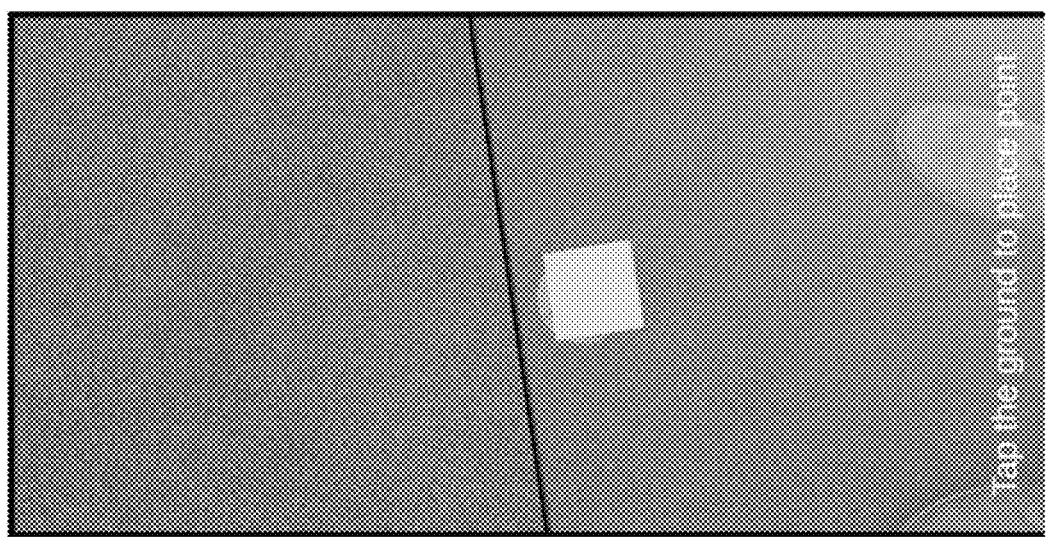

Reference is made to FIGS. 6A and 6B, which illustrate a first user interface 600A and a second user interface 600B, respectively, displayed on a client device 510 of FIG. 5, in accordance with embodiments of the present disclosure.

In examples described herein, respective golf holes (e.g., target destination location) or landmark objects may be associated with spatial anchor data for providing a common frame of reference among a physical putting area 226 (FIG. 3) and a virtual golf hole of a virtual golf system. When the putting area 226 is initially set up or when respective golf hole locations may be altered (e.g., relocating golf holes for maintenance or for updating the configuration of the putting area 226), a technician may operate the client device 510 for generating spatial anchors associated with the putting area 226. In some embodiments, the client device 510 may be configured to observe one or more sets of sensor data received from image sensors, magnetometers, accelerometers, among other examples, for generating data associated with an environment. In some embodiments, the client device 510 may include operations for generating a map of an unknown environment while simultaneously tracking the client's location at the environment (e.g., simultaneous localization and mapping (SLAM) operations). As such, the client device 510 may generate spatial anchor data based on the obtained sensor data. In some examples, client devices 510 may utilize the anchor data for generating a representation of the environment proximal to target destination locations (e.g., golf holes) for emulating virtual golf holes.

In FIG. 6A, the first user interface 600A may depict the technician user proximal to the target destination location. The technician user may provide an indication that the current location detected by the client device 510 may be a target destination location for generating spatial anchor data. The client device 510 may generate location data, such as GPS coordinate data, magnetometer data, or the like, for storing location data of the target destination location.

The technician user may subsequently operate the client device 510 while traversing the putting green proximal to the target destination location with which spatial anchor data is being generated. As the technician user walks around the putting green while holding the client device 510, the client device 510 may capture a series of image data for mapping the putting area 226 based on one or a combination of simultaneous localization and mapping (SLAM) operations, GPS coordinate detection, and magnetometer.

As shown in the second user interface 600B of FIG. 6B, the client device 510 may generate a graphical interface for overlaying surface polygons atop the substantially real-time camera feed for illustrating topographical data of the putting area 226. In some embodiments, the surface polygons may include data associated with a planar surface circumscribed by a boundary. The surface polygons may indicate portions of a playing surface on which topography data may be available.

Topography data may include datasets associated with the geometry of a playing surface, features of the playing surface (e.g., landmark objects, among other examples), or attributes (e.g., surface characteristics such as grass length, playing surface firmness, color, among other examples). In some examples, the geometry of a playing surface may be represented by a geometric mesh showing the playing surface in a way that is abstracted from playing surface characteristics.

The client device 510 may receive user input for designating the position of the golf hole (e.g., target destination location) on the displayed surface polygon for generating spatial anchor data associated with that surface polygon. In some embodiments, spatial anchor data may include data structures containing coordinate information, and other positioning marker data, such as global positioning system and compass data measurements.

In some embodiments, a landmark object may be associated with the target destination location. The landmark object may be a flag pin, and a visual comparison among the flag pin and the golf green may reveal high visual contrast, edges, or the like. The client device 510 may associate image frames associated with the putting area 226 and the landmark object for associating with spatial anchor data. As will be illustrated in examples described herein, the client device 510 may provide an overlay of direction interface elements atop a substantially real-time camera feed based on the spatial anchor data.

Upon the client device 510 being operated to generate spatial anchor data, the client device 510 may transmit the spatial anchor data or data for generating such spatial anchor data to the system 500 for storing at the data store 514 (FIG. 5). The system 500 may transmit, to any number of client devices 510, spatial anchor data associated with the respective target destination locations or associated landmark objects such that the client devices 510 may generate an overlay of direction interface elements on image data for guiding a user to a ball placement location on the playing surface.

Reference is made to FIGS. 7A, 7B, 8A, and 8B, which illustrate graphical user interfaces having overlaid graphical elements on an image feed at a client device, in accordance with embodiments of the present disclosure. The image feed may be a combination of image frames or a video feed showing a camera field of view of the client device in substantially real time. A user may hold the client device with a camera lens oriented towards a putting green, and the client device may display the image feed on a display while the user walks about the putting green.

Figure 7A:
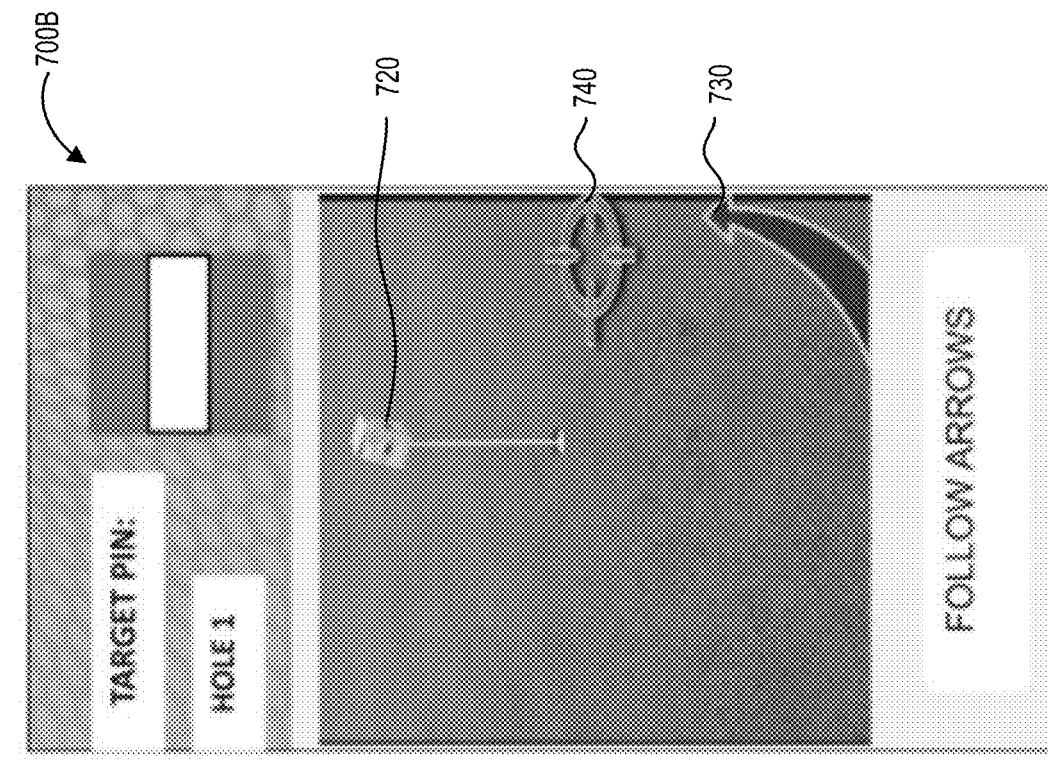
FIGS. 7A, 7B, 8A, and 8B illustrate graphical user interfaces having overlaid graphical elements on an image feed at a client device, in accordance with embodiments of the present disclosure.

In FIG. 7A, the user interface 700A may include indicia 702 for guiding the user to a target golf hole. For example, the indicia 702 may include text stating that the user is to walk towards a golf hole labeled "Hole 1". In another example, the indicia 702 may include a graphical indicia, such as a logo or color, corresponding to a flag pin.

In FIG. 7A, the user interface 700A illustrates an image feed of the putting surface 226 and a target destination location 710. The target destination location 710 may be the target golf hole. As the putting surface 226 may be predominantly green and may not include features having high contrast or sharp visual edges, locating the target destination location 710 may be challenging. In some embodiments, the target destination location 710 may be associated with a landmark object 720, such as a flag pin having a distinctive color or features having contrast to the putting surface 226. Other landmark objects, such as trees or golf course markers, among other examples, may be contemplated.

In some embodiments, a user may position the client device such that the camera field of view may capture the landmark object 720. Based on the landmark object 720, the client device may obtain anchor data associated with the landmark object 720 and current location data of the client device (e.g., global positioning system data) for generating direction interface elements to guide the user to a ball placement location on the putting surface 226.

In some embodiments, the client device may display instructions for directing the user to adjust the camera field of view such that the landmark object 720 is positioned near the top of the image viewfinder 750.

In some embodiments, the client device may conduct operations for comparing location data associated with a target ball placement location and current location data associated with the client device for generating a sequence of directions for guiding the user to the target ball placement location.

Figure 7B:
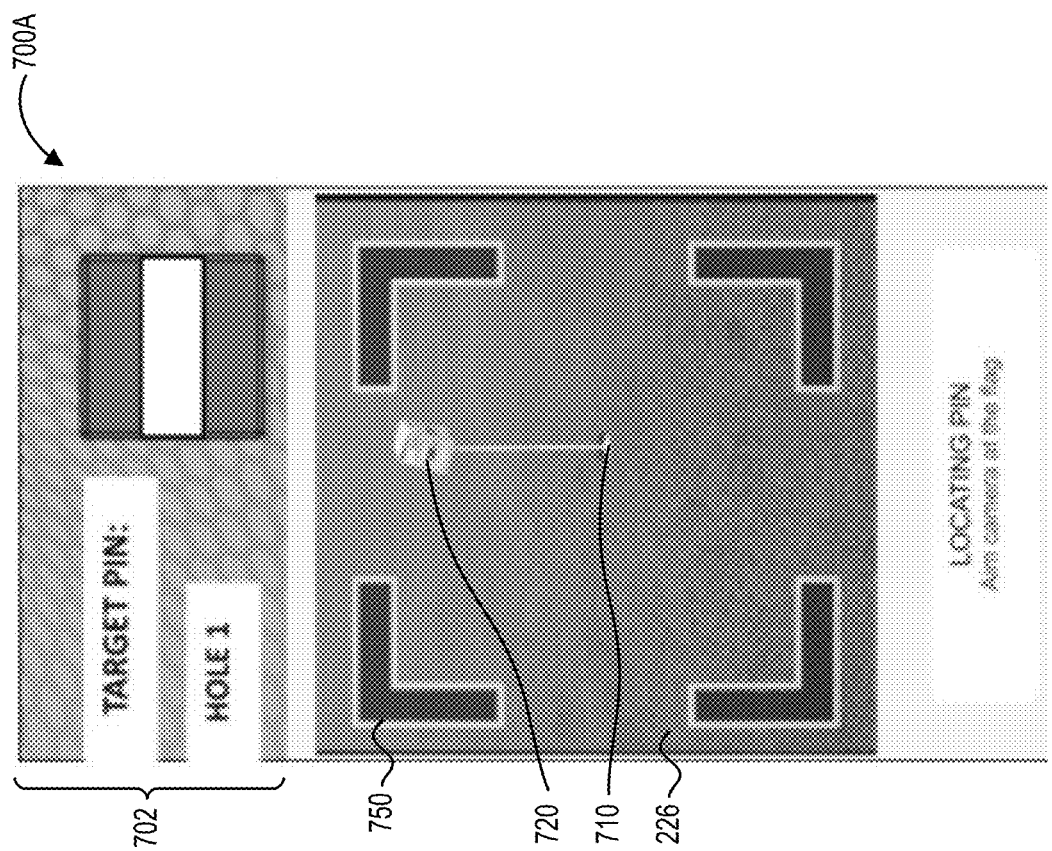

In FIG. 7B, the user interface 700B dynamically displays a direction interface element 730 for overlaying on the image feed displayed by the client device. The image feed may include the target destination location 710 and the landmark object 720 as visual reference points for guiding the user to a ball placement location 740.

In some embodiments, the direction interface element 730 may be an arrow for indicating a suggested direction for the user to walk for arriving at the ball placement location 740. The ball placement location 740 may be indicated by hash-marks or other indicia.

In response to the user walking about the putting surface 226, the image feed may be updated in substantially real time to show an updated field of view of the target destination location 710 and the associated landmark object 720. When the user walks about the putting surface 226, the client device may dynamically obtain position data (e.g., updated global positioning system coordinates) for tracking the location of the user relative to the target destination location 710, and may dynamically generate updated direction interface elements based on the current client device location relative to the target ball placement location 740 or the landmark object 720.

In some embodiments, anchor data associated with the landmark object 720 may be configured for providing a reference coordinate system for associating the physical putting surface 226 and the virtual golf ball location.

Figure 8B:
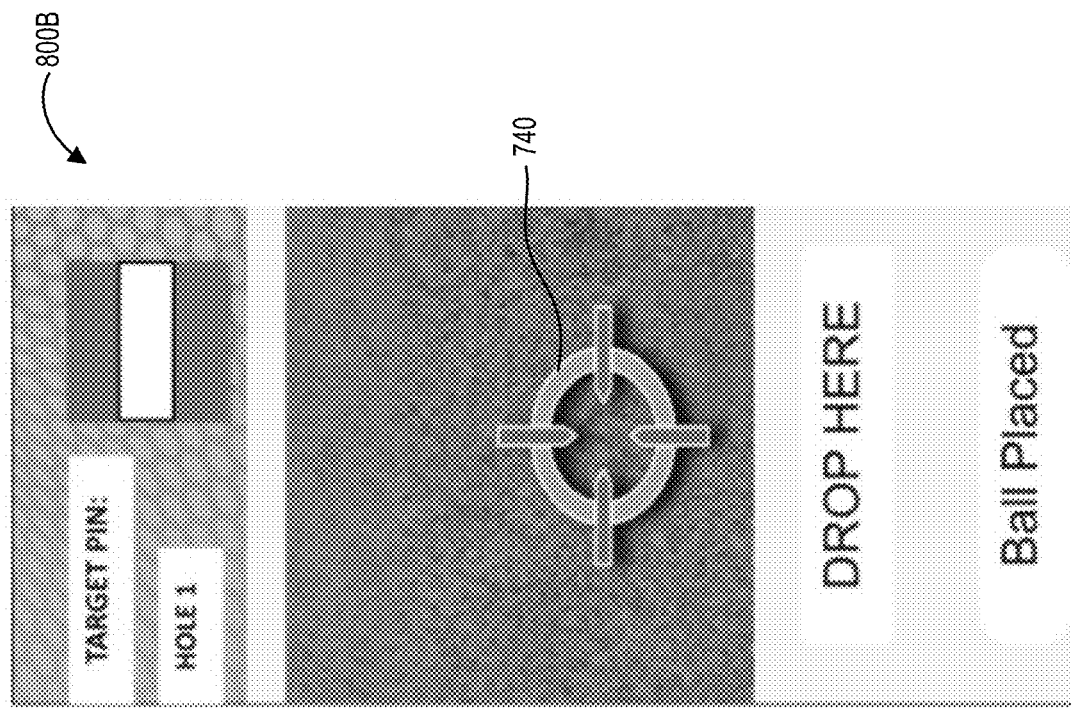
Figure 8A:
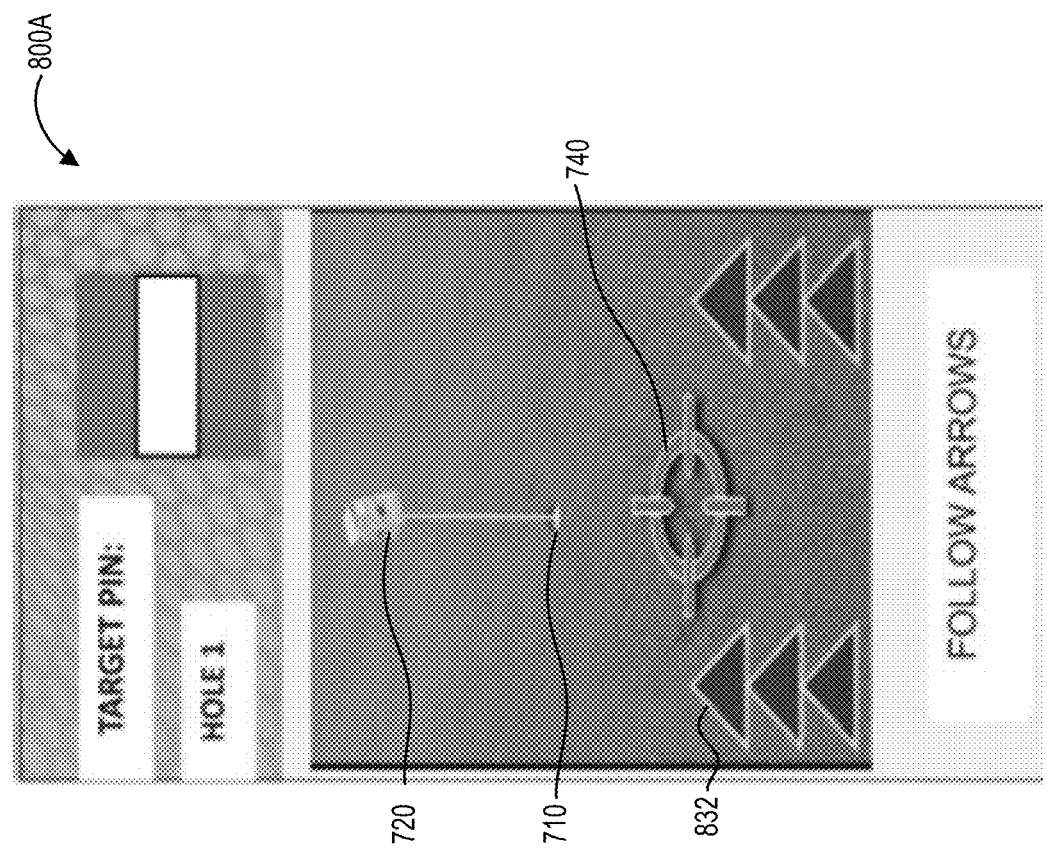

Upon the user physically following the direction interface element 730 (e.g., arrow) of FIG. 7B, the client device may display: (i) an updated image feed of the landmark object 720 and the target destination location 710 relative to the target ball placement location 740, as shown in FIG. 8A. In the illustrated example, the updated image field 800A is based on a perspective that is centered on or revolves around the landmark object 720.

In response to the client device obtaining updated client device location data relative to the landmark object 720, the client device may dynamically display an updated user interface element 832 to provide subsequent direction towards the ball placement location 740. In the example illustrated in FIG. 8A, the updated direction to the user is to traverse/walk forward towards the landmark object 720.

As the client device traverses/walks closer to the ball placement location, the image feed may show a gradually "zoomed in" image of the putting surface 226. In response to the client device determining that the user is substantially proximal to the target ball placement location 740, the client device may dynamically display instructions for guiding the user to place a golf ball at the target ball placement location 740 shown by an indicia.

In the above-described example, the user may operate the client device for capturing, in substantially real time, an image feed representing their field of view while traversing the putting surface 226. The image feed may be augmented with direction interface elements for guiding the user to a location on the putting surface 226 for placing a golf ball at a target ball placement location 740. As such, embodiments of devices and methods described in the present disclosure may provide a tool for tracking the physical location of the user on the putting surface 226 and guiding the user to a physical target ball placement location for emulating a virtual golf hole.

In some embodiments, the devices and methods described in the present disclosure may be configured for a virtual golf system. In some embodiments, the devices and methods described in the present disclosure may be configured for a traditional golf course, thereby being a tool for tracking successive golf ball locations during a golf game.

Reference is made to FIGS. 9A, 9B, 10A, 10B, and 11, which illustrate graphical user interfaces for dynamically guiding a user to a target ball placement location, in accordance with another embodiment of the present disclosure.

In some scenarios, the client device may not be configured with an image capture device for receiving substantial real-time images and for displaying the image feed on a display. The client device may be configured to provide direction interface elements relative to a theoretical map of the putting surface.

Figure 9B:
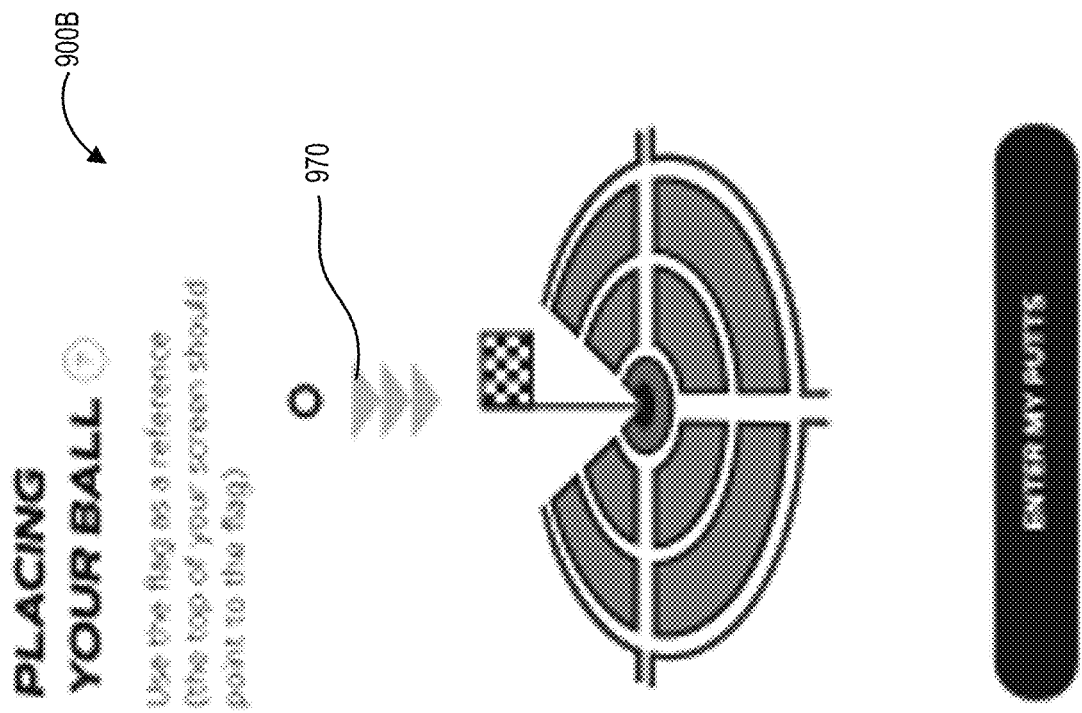
Figure 9A:
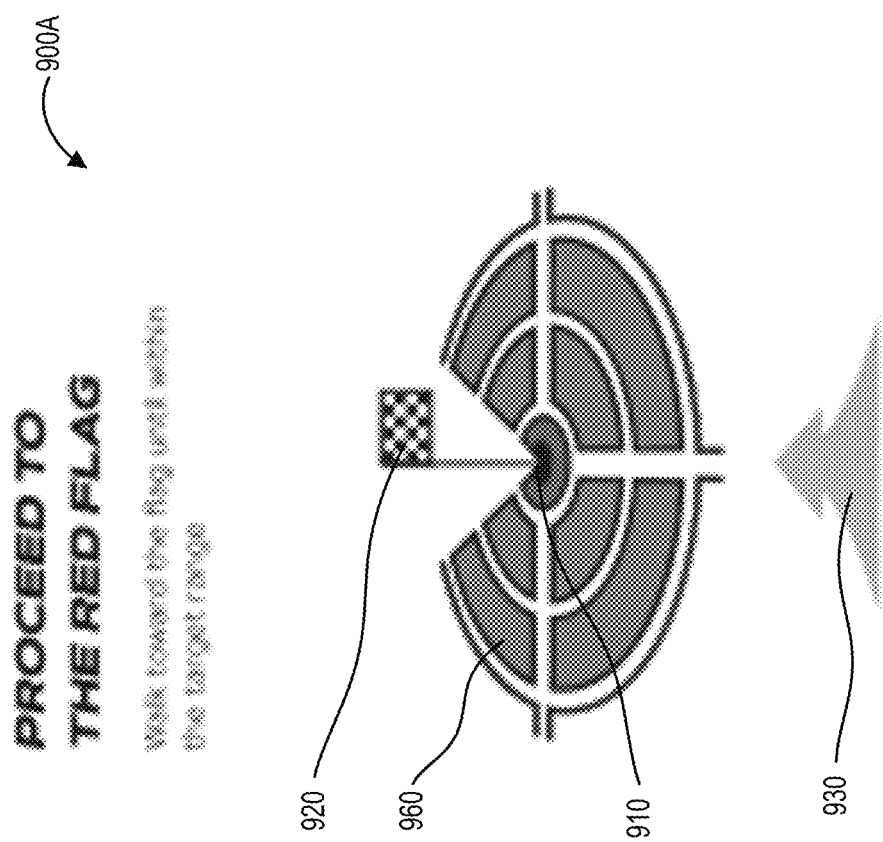

In FIG. 9A, the graphical user interface 900A may include a theoretical map 960 of a putting surface. The theoretical map 960 may include a graphical representation of a landmark object 920 (e.g., flag pin) and the target destination location 910 (e.g., golf hole). Based on current client device location data, the client device may generate one or more direction interface elements 930 for guiding the user to a ball placement location on the putting surface.

As the client device may not be configured to provide a real-time image feed on a display for providing guidance to the user, the client device may instruct the user to orient the client device in physical space such that, from the perspective of the user looking at the client device screen, the physical landmark object may be aligned with or proximal to the top of the client device display screen. In FIG. 9B, the graphical user interface 900B may provide a guiding indicia to provide instruction to orient the top of the client device display with the physical landmark object.

Figure 10A:
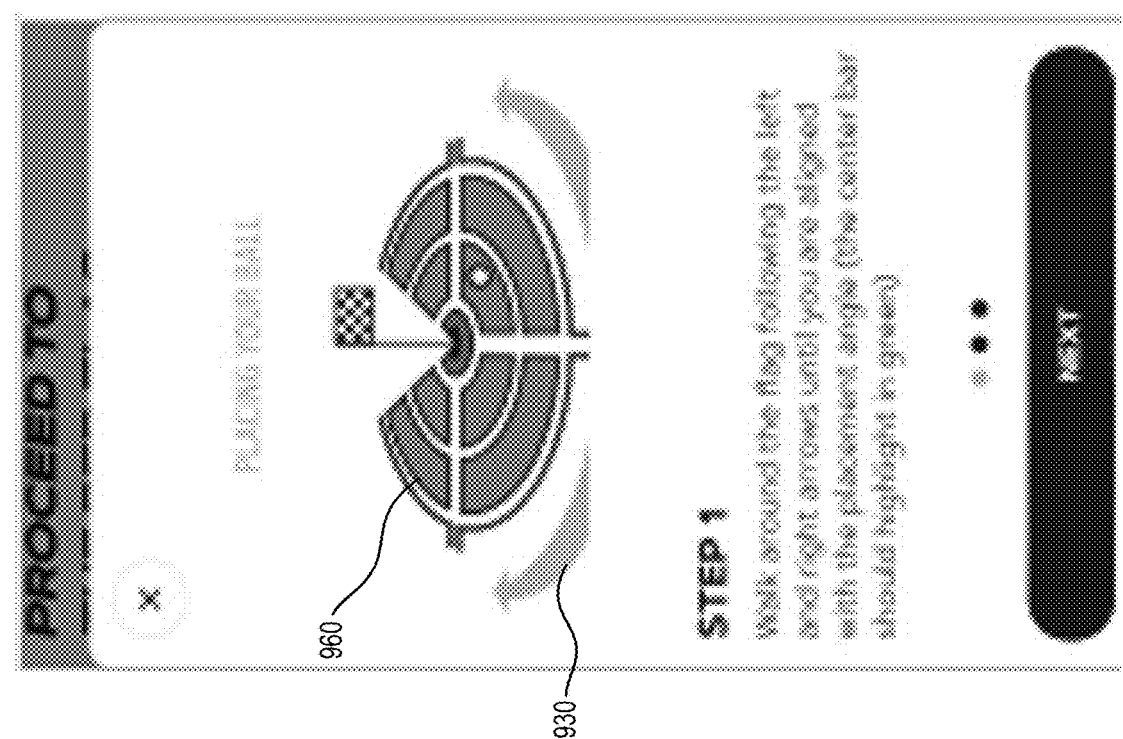
Figure 10B:
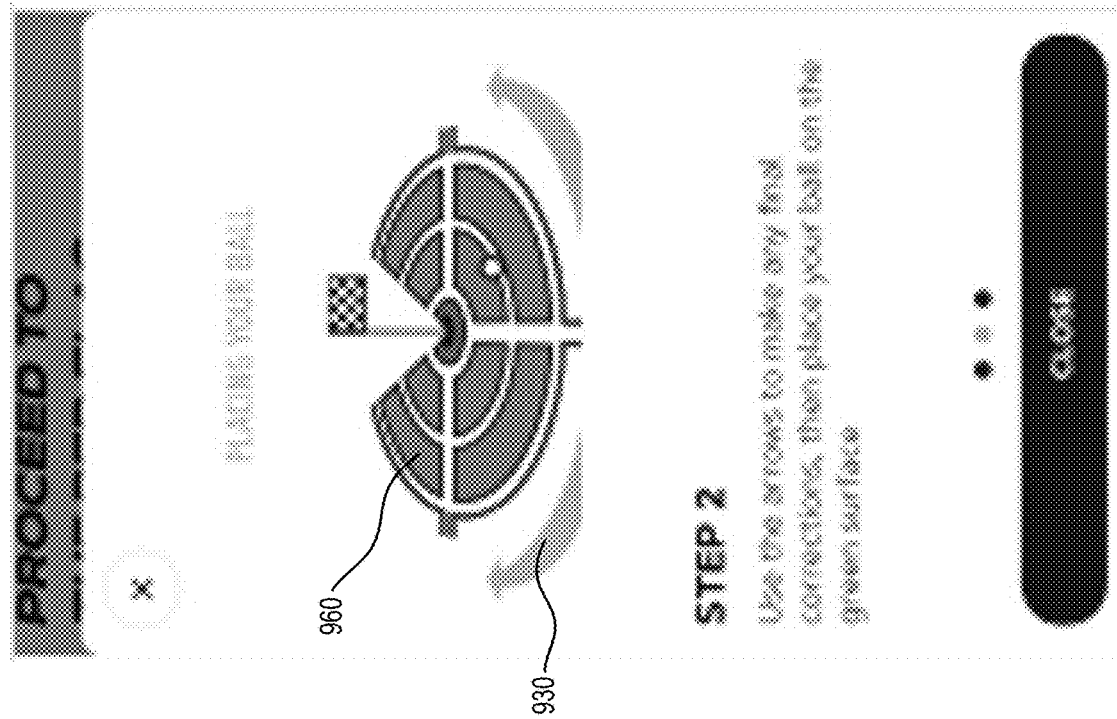

In FIGS. 10A and 10B, the graphical user interfaces may dynamically display direction interface elements in combination with the theoretical map 960 of the putting surface for guiding the user to a ball placement location on the playing surface. The generated direction interface elements 930 may be dynamically updated in response to detected changes in the client device location. As the user walks about the putting surface while holding the client device, the client device location may be a proxy for identifying changes in the user's location on the putting surface.

In response to the user traversing the putting surface towards the target ball placement location, the theoretical map 960 may dynamically provide indicia for providing granular direction associated with whether the user should walk closer to or away from the landmark object 920 to arrive at the target ball placement location 1140. In FIG. 11, the landmark object 920 in combination with the theoretical map 960 may provide dynamically updating direction interface elements 962 to iteratively guide the user towards the ball placement location 1140.

In some embodiments, the theoretical map 960 may include a series of concentric rings about the landmark object 920, and the concentric regions may be highlighted with different colors or indicia for guiding the user nearer or further from the landmark object 920.

Reference is made to FIGS. 12A, 12B, 13A, 13B, 14A, and 14B, which illustrate graphical user interfaces for dynamically guiding a user to a target ball placement location, in accordance with embodiments of the present disclosure. The graphical user interfaces in the above-described drawings illustrate a target destination location 1210 and an associated landmark object 1220. The target destination location 1210 may be the target golf hole, and the landmark object 1220 may be a flag pin having distinctive indicia.

In some embodiments, the graphical user interfaces may include one or more concentric ring elements about the landmark object 1220 for illustrating one or more relative distances from the landmark object 1220 in a radial direction.

The graphical user interfaces may include a target ball placement location icon 1240 and a client device location icon 1260. The target ball placement location icon 1240 may represent a virtual ball placement position that has been correlated with the physical putting surface.

The client device location icon 1260 may provide an indication of the current position of the client device, which may be a proxy for a user location, relative to the landmark object 1220 and the target ball placement location.

In some embodiments, direction interface elements may be configured to guide the user to the ball placement location on the putting surface. For example, an annular direction interface element 1230a may provide guidance to traverse a path in an annular direction about the landmark object 1220. In another example, an advancement direction interface element 1230b may provide guidance to traverse a path in a radial direction relative to the landmark object 1220.

Figures 12A, 12B:
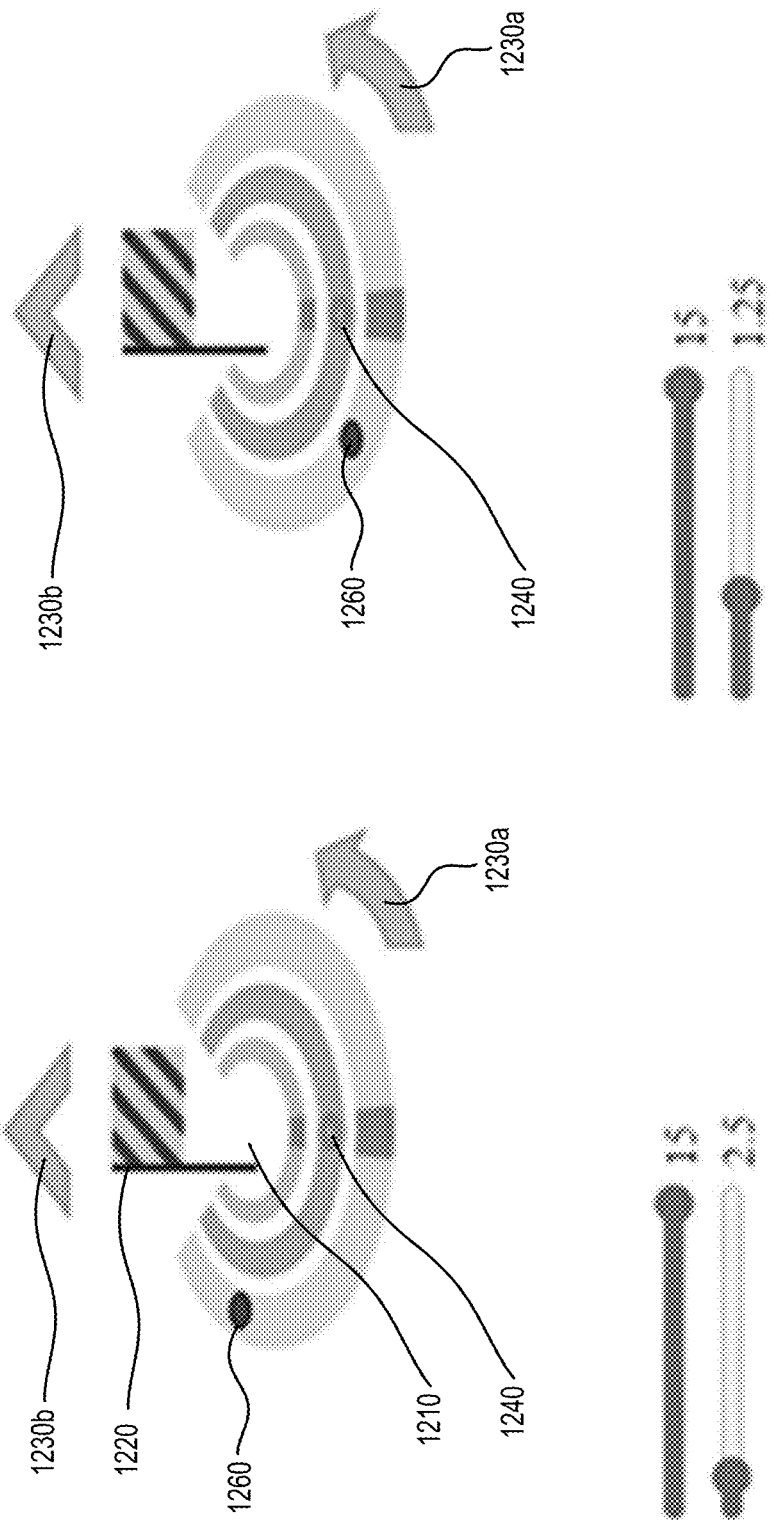
FIGS. 12A, 12B, 13A, 13B, 14A, and 14B illustrate graphical user interfaces for dynamically guiding a user to a target ball placement location, in accordance with embodiments of the present disclosure.

To illustrate, when the client device location data indicates movement of the client device along a path in an annular direction of a circumference of a circular ring object, the client device location icon 1260 may dynamically be updated, as illustrated in a comparison of the graphical user interfaces from FIG. 12A to FIG. 12B.

Figure 13B:
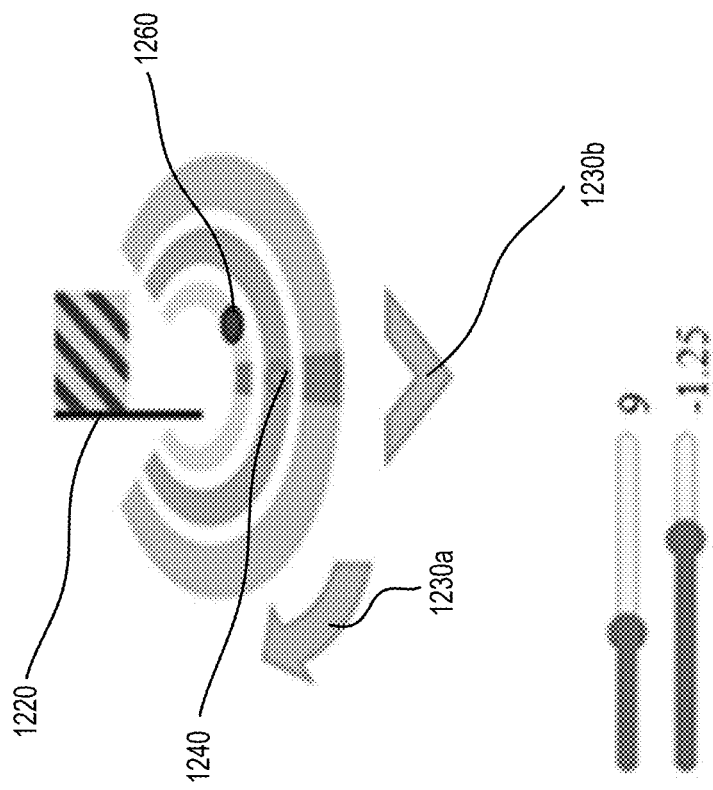
Figure 13A:
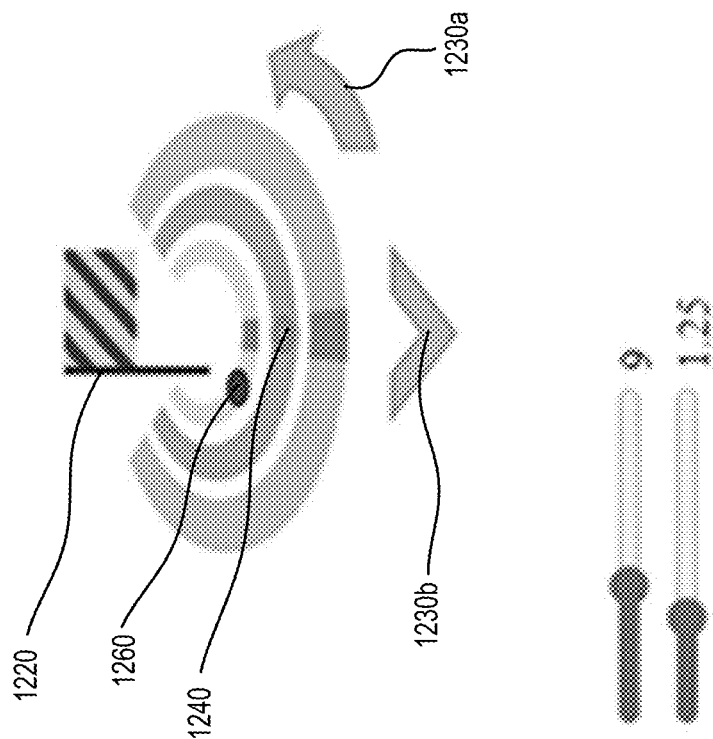

When the client device location data indicates movement of the client device along a path in a radial direction that is nearer to the landmark object 1120, the client device location icon 1260 may dynamically be updated, as illustrated in a comparison of the graphical user interfaces from FIG. 12B to FIG. 13A. In FIG. 13A, because the movement of the client device along the path in a radial direction may be nearer to the landmark object 1220, the advancement direction interface element 1230b may be updated to provide guidance for traversing a path in an opposing direction (e.g., downwards in the illustration of FIG. 13A).

When the client device location data indicates movement of the client device along a path in an annular direction of a circumference of a circular ring object, the annular direction interface element 1230a may be updated to provide subsequent guidance to the user. As illustrated in a comparison of the graphical user interfaces from FIG. 13A to FIG. 13B, the client device may have travelled a path beyond the target ball placement location in an annular direction, and the annular direction interface element 1230a may be updated to point in an opposing direction as compared to that illustrated in FIG. 13A.

When comparing the graphical user interfaces from FIG. 13B to FIG. 14A, the client device may have travelled along a path in a radial direction to be within a substantially similar radial distance from the landmark object 1220 as the target ball placement location. As such, the client device may update direction interface elements to include solely the annular direction interface element 1230a and to exclude the advancement direction interface element 1230b. Because the client device is located at a substantially similar radial location relative to the landmark object 1220 as compared to the target ball placement location (indicated by the target ball placement location icon 1240, the user may travel a path along a circular path about the landmark object 1220 in an annular direction to arrive at the target ball placement location.

Figures 14A, 14B:
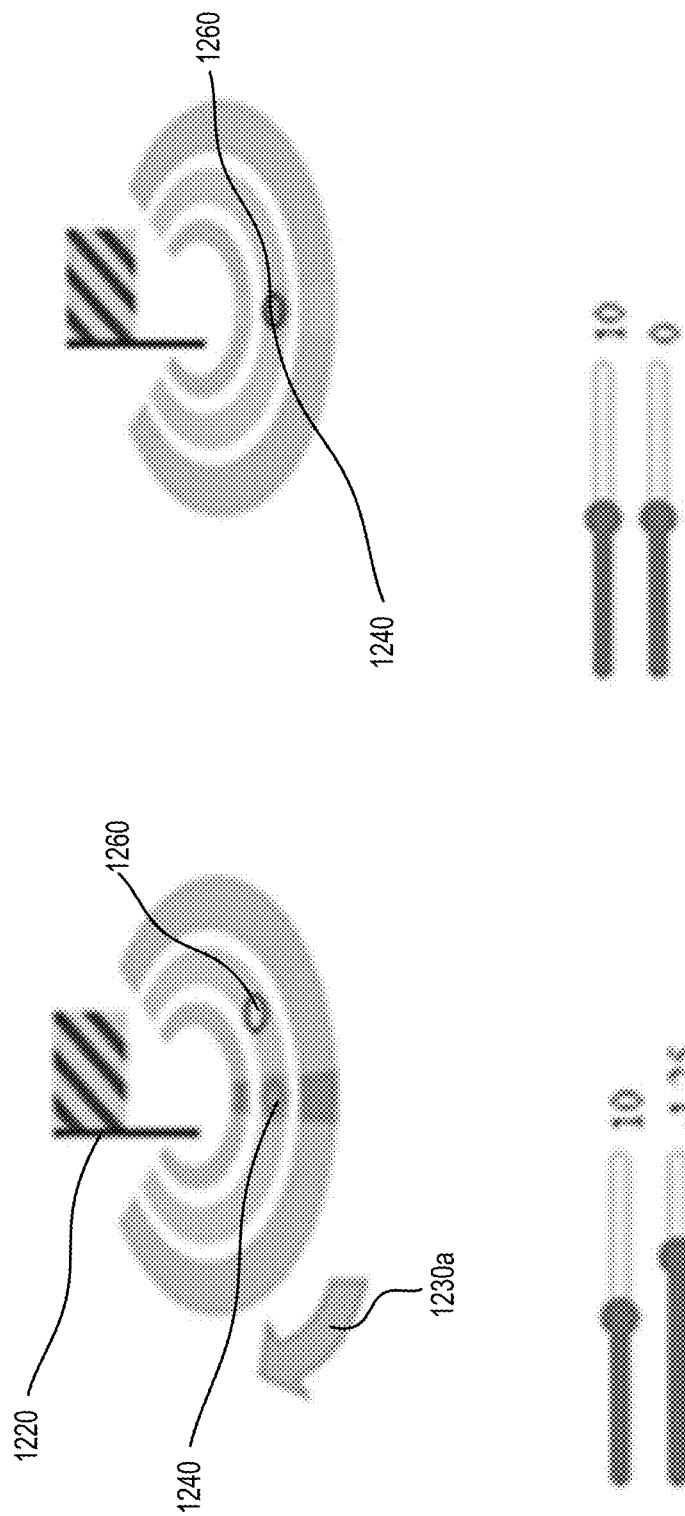

As illustrated in a comparison of the graphical user interfaces from FIG. 14A to FIG. 14B, travelling along the circular path about the landmark object 1220 in the annular direction places the client device at the target ball placement location.

Although the above-described examples are based on a polar coordinate system having location information based on a reference point and an angle from a reference location, other types of coordinate systems may be used.

The above-described sequence of examples illustrate embodiments of dynamically generated user interface elements that may be updated based at least on: a current location of the client device (as a proxy for a golf user's location), a target ball placement location, or the landmark object 1220.

In some embodiments described in the present disclosure, user interface elements for guiding a user to a target ball placement location may be based at least in part on global positioning system data, magnetometer sensor data, or other sensor data for tracking a client device location in a coordinate system. It may be beneficial to configure a golf system for dynamically guiding a user to a ball placement location on the playing surface with greater accuracy.

Figure 15:
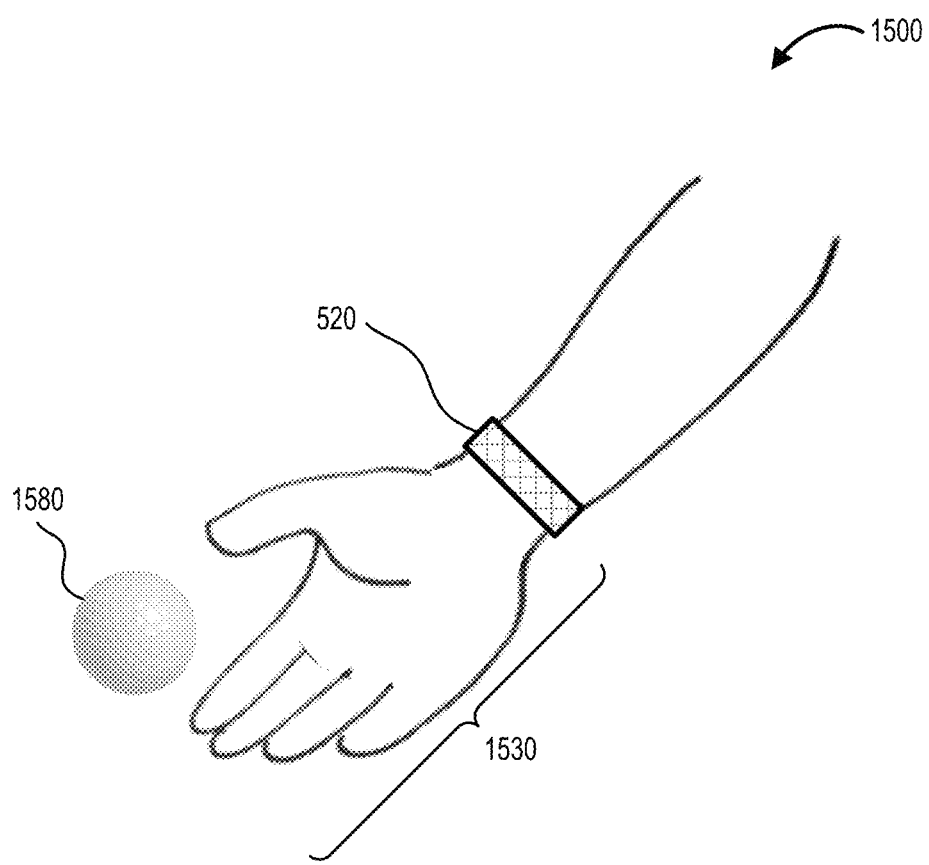
FIG. 15 illustrates a partial view of a user's arm with a tracking device affixed thereto, in accordance with an embodiment of the present disclosure.

Reference is made to FIG. 15, which illustrates a partial view of a user's arm 1500 with a tracking device 520 (FIG. 5) affixed thereto, in accordance with an embodiment of the present disclosure. The tracking device 520 may be worn on the user's wrist, which may be associated with a hand for placing a golf ball onto a golf putting green.

In some situations, positioning a golf ball 1580 at a position a few inches away from a true placement position may provide a player with an unearned advantage (e.g., potentially easier putt to a target hole) over another player. In some situations, inaccuracies causing a deviation from the true placement position may be caused by an offset distance 1530 between a hand of a player and a position of the tracking device 520 worn by the player. It may be beneficial to provide systems and methods directed to reducing inaccuracies associated with providing instructions or prompts to the player for positioning the golf ball at a true ball placement position 162.

In FIG. 15, the tracking device 520 may be a wearable device worn on the player's wrist. In some embodiments, the system 500 may be configured to determine an offset vector associated with a distance between the tracking device 520 and the player's fingertips. In some embodiments, the determined offset vector may be determined based on features such as the golf ball diameter 1580 and the hand position at a time when the player may place a golf ball onto the putting green. As such, the system 500 may determine a golf ball position with greater granularity or accuracy (e.g., a "true" ball position).

In some embodiments, tracking device 520 may be registered at the system 500. During a registration process, the system 500 may conduct processor executable instructions to calibrate the tracking device 520 for determining the offset vector associated with a distance between the tracking device 520 and the fingertips of the player's hand.

In an example, the tracking device 520 may be registered with the system 500 based on interaction with a sensor or other computing device at a known/fixed position (e.g., registration computing device). Once the player has donned the tracking device 520, the player may initiate a calibration operation via the tracking device 520 or a client device 510 associated with that player. In response to the initialization operation, the system 500 may identify the tracking device 520 that may be proximal to the sensor at the registration computing device. The registration computing device may display a "Calibrate" button on a graphical user interface, and once the player interacts with the "Calibrate" button using the hand associated with the wrist on which the tracking device 520 is installed, the system 500 may receive position data associated with the tracking device 520 and may determine the offset vector associated with a distance between the tracking device 520 and the player fingertip used to interact with the "Calibrate" button.

In the present example, the offset vector may be based on the identified distance between: (1) the position of the tracking device 520 at the time that the player interacted with the "Calibrate" button; and (2) the position of the registration computing device (the position/location, which may be a known). The system 500 may associate the determined offset vector with that tracking device 520 and with that particular player.

The above-described examples include determining an offset vector associated with the distance between the tracking device 520 and the player's finger tips. In some embodiments, the tracking device 520 may be worn by the user on other portions of the user's body, and the offset vector may be based on a distance between the tracking device 520 and a relative distance to a target placement position.

For example, the tracking device 520 may be worn on the user's ankle, and the offset vector may be associated with a distance between a typical distance between the user's foot and the target placement position when the user crouches down or bends over to place a golf ball at the target placement position on the putting green. Thus, in some examples, the offset vector may be a function of the user's height, arm length, or other user anatomical features.

In some examples, when the tracking device 520 is configured as an anklet, the system 500 may determine an offset vector based on a distance between the anklet and the toes of the player's foot. Once the offset vector associated with the player is determined, in some situations, the system may determine a ball placement position based on a user tapping the user's toes at the ball placement position. That is, the system may determine the ball placement position by determining the position of the anklet and offsetting the anklet position by the offset vector.

In some embodiments described herein, the system 500 may be configured to determine an offset vector associated with a relative position between a tracking device and a physical placement position, and may be configured to generate an updated trajectory path based on the offset vector to correct for a distance between the wearable device worn by the user and the physical placement position during user placement of the golf ball at the physical placement position.

In some embodiments, the client device 510 may be configured to generate user interface elements for overlaying on substantially real-time image data on the client device 510 for guiding the user to a ball placement location based at least on: (i) anchor data associated with a landmark object on the putting surface; (ii) current location data of the client device, as a proxy for the current location of the golf user; or (iii) current location of the tracking device 520 and an associated offset vector 1530 determined by the system.

Figure 16:
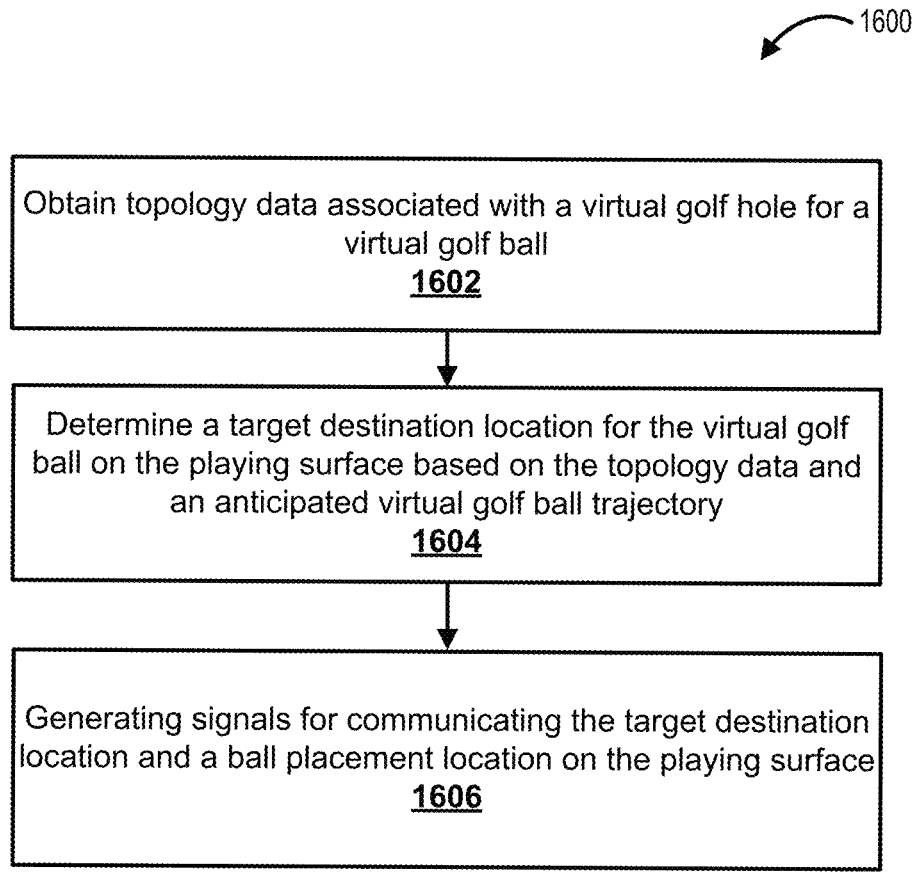
FIG. 16 illustrates a flowchart of a method for a golf system, in accordance with embodiments of the present disclosure.

Reference is made to FIG. 16, which illustrates a flowchart of a method 1600 for a golf system, in accordance with embodiments of the present disclosure. The method 1600 may be conducted by a processor of a computing device, such as the client device 510 of the system 500 (FIG. 5). Other computing devices may be configured to conduct the method 1600 of FIG. 16. Processor-executable instructions may be stored in a memory and may be associated with processor-executable applications. The method 1600 may include operations such as data retrievals, data manipulations, data storage, or other operations, and may include computer-executable operations.

In some embodiments, the client device 510 may be associated with a user at a playing surface having at least one landmark object. For example, the playing surface may be the putting green 100 of FIG. 1. With the putting green 100 of FIG. 1, the client device 510 may conduct operations for communicating a ball placement location on the playing surface or the target destination location for the golf ball. For example, the client device 510 may be configured to provide guidance to the golfer on where to place the golf ball, subsequent to the golfer having picked the ball up from the playing surface (e.g., as a courtesy to other golfers who may be putting their respective golf balls).

In some embodiments, the client device 510 may conduct operations for communicating a ball placement location on the putting area 226 of FIG. 3 and the target destination location for the golf ball. For example, the putting area 226 may be configured as a component of a virtual golf system. As described in some examples herein, subsequent to hitting all tee shots, approach shots, or chip shots on other playing surfaces, the user may successively play all their putting shots for all 18-holes of a virtual golf game on the putting area 226. For example, for the respective virtual holes of the virtual golf game, the client device 510 may conduct operations for communicating from what location and to which target destination location (e.g., golf hole) the user is to putt their golf ball.

At operation 1602, the client device may obtain topography data associated with a virtual golf hole for a virtual golf ball. In some embodiments, the topography data may include datasets associated with the geometry of a playing surface, features of a playing surface (e.g., landmark objects, among other examples), or attributes (e.g., surface characteristics such as grass length, playing surface firmness, color, among other examples). In some examples, attributes may include objective measurements associated with how "fast" or "slow" the putting green/playing surface may be.

As an illustrating example, the topography data associated with a virtual golf ball position may include data associated with playing surface characteristic between the virtual golf ball position and a target golf hole location. For instance, the topography data may include data indicating that the distance between the virtual ball position and the target golf hole is 15 feet, among other data. The client device may base subsequent operations for identifying ball placement locations or target destination locations at a physical playing surface based on the topography data.

In some embodiments, the client device may receive spatial anchor data, which may include topography data associated with the virtual golf hole. In some embodiments, the client device may obtain topography data based on sensor data (e.g., such as image data, accelerometer data, magnetometer data, among other examples) at the client device. In some embodiments, the topography data may be stored at a system 500 (FIG. 5) and transmitted to the client device.

At operation 1604, the client device may determine a target destination location for the virtual golf ball on the playing surface based on the topography data and an anticipated virtual golf ball trajectory. In some embodiments, the anticipated virtual golf ball trajectory may be an anticipated ball path along a playing surface. For instance, the anticipated ball path may be associated with the path along which the ball rolls.

In some embodiments, determining the target destination location for the virtual golf ball on the playing surface may be based on the geometry of the playing surface or features of the playing surface (e.g., with respect to a flag pin landmark object), to the exclusion of playing surface attributes. Other operations for determining the target destination location based on one or a combination of geometry, features, or attributes of a playing surface may be used.

In some embodiments, the putting area 226, such as that illustrated in FIG. 3, may include a plurality of possible destination locations. Each of the possible destination locations (e.g., golf holes) may be respectively associated with a landmark object, such as a flag pin. The client device may identify a subset of destination locations within the putting area 226 that may be suitable target destination locations.

For example, the client device may identify destination locations identified with reference numerals 9, 10, or 12 as possible destination locations at least because these golf holes may be positioned to receive golf balls resulting from longer putts (e.g., 15 feet or more).

The client device may determine a target destination location from the subset of destination locations based on topography data portions associated with the anticipated golf ball trajectory for emulating the virtual golf hole. For example, it may not be necessary to identify portions of the putting area 226 that substantially correspond to a virtual representation of Hole 3 at Augusta National Golf Club; rather, the client device may identify a target destination location based on a subset of topography data representing an anticipated putting surface between the virtual golf ball and a virtual golf hole for mapping to the putting area 226.

By identifying the target destination location based on topography data representing an anticipated putting surface between the virtual golf ball and a virtual golf hole, the client device may not need to consider voluminous set of virtual golf hole characteristics, but rather consider the portion of golf hole characteristics associated with the playing area along the anticipated golf ball trajectory. Such operations may reduce the computational requirements for determining the target destination location on the putting area 226, and may provide efficiencies associated with identifying a target golf hole on the putting area 226.

In some embodiments, the determined target destination location may be based on optimizing at least one of: a number of users on the playing surface at a given time, wear pattern (e.g., wearing out of grass due to foot traffic) of the playing surface, or flow of users traversing the putting area 226. For example, optimizing the number of users on the playing surface at a given time may include optimizing utilization or maximizing a number of golf users playing a golf ball at respective target destination locations on the playing surface. For example, referring again to the putting area 226 of FIG. 3, if a destination location (e.g., target golf hole) may be any one of golf holes identified with reference numerals 9, 10, or 12, the client device may determine a target destination location (e.g., target golf hole) that optimizes utilization of the putting area 226. In another example, optimizing the flow of users across the putting area 226 may include providing direction to users such that the user avoids traversing back and forth (e.g., zig-zagging) along the putting area 226. In another example, optimizing the wear pattern may include directing users to target golf holes in areas having relatively reduced foot traffic.

To illustrate, if other golfers may have a virtual golf ball that may be emulated only by destination locations identified by reference numerals 9 and 10 (but not the golf hole identified by reference numeral 12), the client device may determine the target destination location to be the golf hole associated with reference numeral 12 so as to allow the golf holes associated with reference numerals 9 and 10 to be available for other users.

At operation 1606, the client device may generate signals for communicating the target destination location and a ball placement location on the playing surface.

In some embodiments, generating signals for communicating the target destination location and the ball placement location on the playing surface may include displaying a direction interface element for overlaying on image data including a landmark object proximal to the target destination location for guiding the user to the ball placement location.

For example, direction interface elements (such as those illustrated in FIG. 7B) may include overlaid interface elements atop a substantially real-time image feed at the client device for providing an augmented reality view of the playing surface as the user advances towards the target ball placement location.

In some embodiments, the direction interface element may be based on a polar coordinate system for providing annular direction centered about the landmark object. For example, the direction interface element 730 illustrated in FIG. 7B provides guidance to a user to follow a substantially circular path having a center on the landmark object (e.g., flag pin).

In some embodiments, the direction interface element may be a displacement direction in a radial direction relative to the landmark object. For example, a direction interface element 832 shown in FIG. 8 may provide guidance to a user to advance closer to the golf hole in a radial direction relative to the landmark object (e.g., the flag pin).

In response to obtaining an updated user location relative to the landmark object, the client device may display an updated interface element to provide subsequent direction towards the ball placement location. For example, as the client device location may be a proxy for a user location, as the user advances nearer to the ball placement location, the client device may provide updated directions to the ball placement location in substantial real time, as illustrated in a substantial real-time image feed on the client device.

In some embodiments, the current user location may be based on at least one of the client device or a tracking device wearable by the user. In embodiments where the client device may be held by the user, the client device location may be a proxy for determining the user's location. In some embodiments, the client device location may be based on global positioning system coordinates or may be based on wireless signal triangulation operations.

In some embodiments, sensors positioned at known locations about the putting area 226 may be configured to track a location of the tracking device for determining a location of the user. In some embodiments, tracking the location of the tracking device may be in place of or may provide more granular location information for supplementing client device location data.

In some embodiments described herein, landmark objects may be flag pins associated with golf holes. In some embodiments, landmark objects may be other objects, such as trees or other course markers, that may be at known locations proximal to a target destination location at the playing surface.

Figure 17:
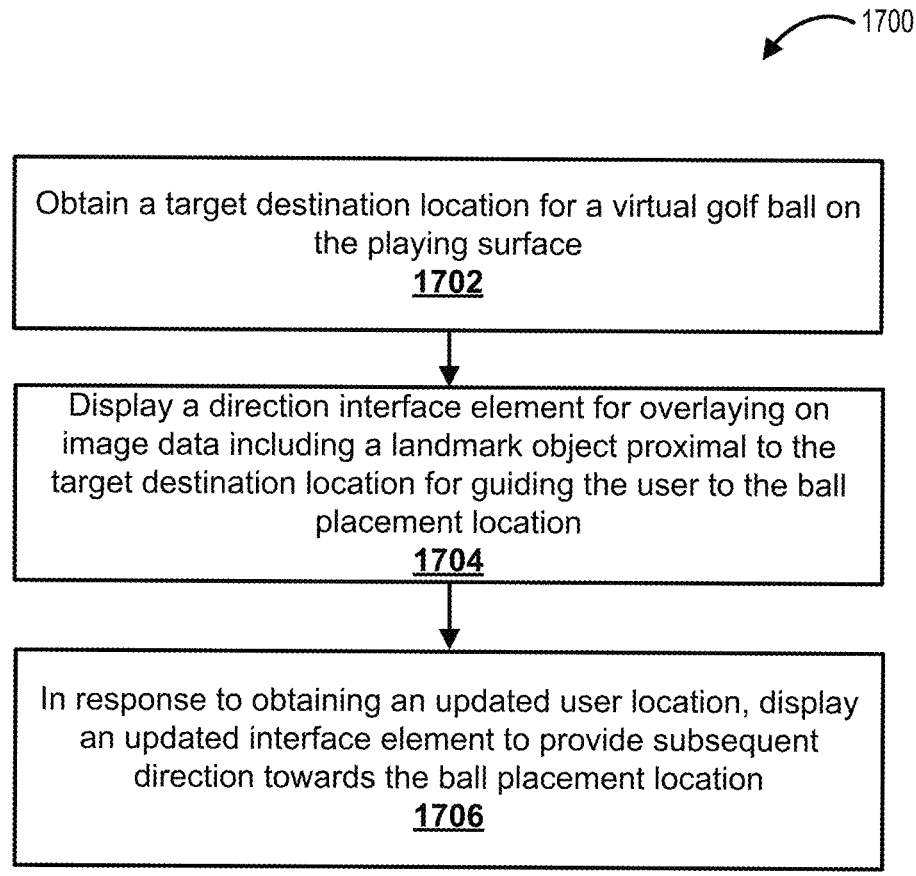
FIG. 17 illustrates a flowchart of a method for a golf system, in accordance with another embodiment of the present disclosure.

Reference is made to FIG. 17, which illustrates a flowchart of a method 1700 for a golf system, in accordance with embodiments of the present disclosure. The method 1700 may be conducted by a processor of a computing device, such as the client device 510 of the system 500 (FIG. 5). Other computing devices may be configured to conduct the method 1700 of FIG. 17. Processor-executable instructions may be stored in a memory and may be associated with processor-executable applications. The method 1700 may include operations such as data retrievals, data manipulations, data storage, or other operations, and may include computer-executable operations.

At operation 1702, the client device may obtain a target destination location for a virtual golf ball on the playing surface. In some embodiments, the target destination location for the virtual golf ball on the playing surface may be based on the topography data and an anticipated virtual ball trajectory. The client device may also obtain a ball placement location on the playing surface associated with the virtual golf ball.

At operation 1704, the client device may display a direction interface element for overlaying on image data including a landmark object proximal to the target destination location for guiding the user to the ball placement location. The direction interface element may be generated based on anchor data associated with the landmark object and a current user location.

In some embodiments, the direction interface element may be based on a polar coordinate system providing annular direction centered about the landmark object and a displacement direction in a radial direction based on the landmark object. In some embodiments, the overlay of the direction interface element atop a substantially real-time image feed at the client device may provide an augmented reality view of the playing surface as the user traverses the playing surface.

In response to obtaining an updated user location, the client device, at operation 1706, may display an updated interface element to provide subsequent direction towards the ball placement location.

Some examples described herein include systems and methods for providing prompts to guide a user towards a physical placement position on a golf green or other golf playing area. In some embodiments, the systems and methods may be configured to receive ball marking information during a golf game. For example, when a player reaches a golf green, the player may need to make two or more putts to place the golf ball in the golf hole. In some situations, it may be conventional for a player to make a golf putt and subsequently pick up the golf ball so that another player may make their respective golf putt in succession or sequence. To dynamically identify subsequent golf ball placement positions on the putting green, in some embodiments, tracking devices may be configured with putters (e.g., specialized golf club) or with ball markers to provide ball position information.

For example, a putter may be configured to include a tracking device positioned at a known position of the putter head (e.g., ball striking surface). The tracking device may be positioned at a center orientation indicator or a hash mark at the center of the putter head. The player may trigger operations to determine ball position information by tapping the putter head on the golf green, by inputting a command on a client device (e.g., mobile device), or other input signal means. The system may determine the ball position information: (1) based on the position of the tracking device affixed to the putter head; and (2) additionally based an offset vector representing a distance between the ball and the tracking device at the known position on the putter head. In the present example, prior to the player using the putter head, the system may have conducted operations to identify the offset vector associated with that putter head based on an offset calibration process similar to examples described herein for identifying the distance between the tracking device and where the golf ball would be positioned adjacent the center orientation indicator or other reference marks.

In another example, a ball marker may be configured to include a tracking device position at a known position on a surface of that ball marker. A ball marker may be a coin-sized device that a player may place beside a golf ball to mark the position of the golf ball on the putting green. When the ball marker is placed on the golf green, the player may pick up the golf ball. In some embodiments of the present disclosure, ball markers may be configured to include a tracking device affixed to a surface of that ball marker at a known position. The ball marker may additionally include a visual indicator, such as a hash mark, an arrow, or the like, as a physical placement guide such that the player may align the ball marker to a golf ball on the golf green. The player may trigger operations to determine ball position information by placing the ball marker relative to the visual indicator (e.g., hash mark, etc.) adjacent the golf ball and pressing the ball marker into the golf green surface. The system may determine the ball position information: (1) based on the position of the tracking device affixed to the ball marker; and (2) additionally based on an offset vector representing a distance between the golf ball and the tracking device at the known position on the ball marker. In the present example, prior to the player using the calibrated ball marker, the system may have conducted operations to identify the offset vector associated with that ball marker based on an offset calibration process similar to examples described herein for identifying the distance between the tracking device and where the golf ball would be positioned adjacent the visual indicator or other reference marks.

In the present examples, when the player is to place their respective golf ball onto the putting green, the system may conduct operations to provide one or more prompts on the user's mobile device to guide the user to place the ball marker or to position the putter head on the putting green such that the position adjacent the reference marks (e.g., visual indicator on the ball marker or center orientation indicator on the putter head) would be the true ball placement position.

In some embodiments described herein, systems and methods have been based on tracking devices adapted to be: (i) worn at a known and/or fixed location on the user's body; or (ii) positioned at a known and/or fixed location on equipment (e.g., ball marker, golf club head, etc.). In some situations, tracking devices may not be worn at known or fixed locations on a player's body. A player may have attached a tracking device (while in a hurry) to a belt, a hat, or other article of clothing. In some further situations, players may not have calibrated their respective tracking devices prior to beginning golf play on the golf course.

In these latter situations, embodiments of systems and methods may include operations to iteratively determine on-the-fly estimated offset vectors based on an inference that the player is wearing the assigned tracking device at some location on the player's body. For example, when the user places a golf ball on a ground surface, the system may receive a user input via a client device and the system may conduct operations to estimate ball placement position relative to the tracking device based on imprecise information on where the tracking device may be worn on the player's body. In the present example, the system may conduct operations to determine coarse grain ball placement position information based on a distance range (e.g., a designated margin of error), where the distance range may be associated with a length of a user's arm, a user's height, or the like.

In the above described situations where tracking devices may not be worn at known/fixed locations on a player's body, the system may conduct operations to generate prompts to guide the user towards a position that may be at a location half way, or some other ratio, between the tracking device and an estimated golf ball placement position to average out uncertainties in providing the golf ball placement position. In another embodiment, the system may conduct operations to generate prompts to guide the user towards a golf ball placement position based on prior knowledge/data of the player's physical dimensions, such as height, typical anatomical movement of arms, legs, torso, or other body parts during walking motion, ball placement motion, etc. That is, embodiments of the system may utilize prior knowledge of the player's physical dimensions to infer a coarse grain offset vector, such that operations for generating prompts to guide the user to a golf ball placement position may be conducted with increasing accuracy.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A golf system comprising:
   a computing device associated with a user at a physical playing surface having at least one landmark object, the computing device including a processor and a memory coupled to the processor, the memory storing processor-executable instructions that, when executed, configure the processor to:
   obtain topography data representing playing surface characteristics between a virtual golf hole and a virtual golf ball;
   determine a plurality of ball placement locations respectively suitable for representing the virtual golf ball on the physical playing surface based on a combination of the topography data and an anticipated virtual golf ball trajectory, the anticipated virtual golf ball trajectory emulating, on the physical playing surface, the virtual golf hole; and generate signals for communicating a selected ball placement location from the plurality of determined ball placement locations to emulate, on the physical playing surface, the golf ball trajectory to a target destination location.

2. The golf system of claim 1, wherein the playing surface includes the plurality of ball placement locations respectively associated with a landmark object, and wherein determining the selected ball placement location includes:

identifying a subset of ball placement locations on the playing surface as a suitable ball placement location based on the combination of the topography data and the anticipated virtual golf ball trajectory; and determining the selected ball placement location from the subset of ball placement locations.

3. The golf system of claim 2, wherein the selected ball placement location is based on optimizing at least one of: a number of golf users playing a golf ball at respective destination locations on the playing surface, playing surface wear pattern, or flow of golf users into and away from the playing surface.

4. The golf system of claim 1, wherein the topography data includes virtual boundary data relative to a virtual target destination location associated with the virtual golf hole.

5. The golf system of claim 1, wherein generating signals for communicating the selected ball placement location and an associated target destination location on the playing surface includes:

displaying a direction interface element for overlaying on image data including a landmark object proximal to the target destination location for guiding the user to the ball placement location, the direction interface element generated based on anchor data associated with the landmark object and a current user location.

6. The golf system of claim 5, wherein the direction interface element is based on a polar coordinate system providing annular direction centered about the landmark object and a displacement direction in a radial direction based on the landmark object.

7. The golf system of claim 5, wherein the overlay of the direction interface element atop the substantially real-time image feed at the computing device provides an augmented reality view of the playing surface as the user traverses the playing surface.

8. The golf system of claim 5, wherein generating signals for communicating the selected ball placement location and the associated target destination location on the playing surface includes:

in response to obtaining an updated user location relative to the landmark object, display an updated interface element to provide subsequent direction towards the selected ball placement location.

9. The golf system of claim 5, wherein the current user location is based on at least one of a location of the computing device being proximal to the user or a location of a tracking device wearable by the user.

10. The golf system of claim 9, wherein the location of the tracking device is based on one or more sensors positioned at known locations on the playing surface.

11. The golf system of claim 1, wherein the landmark object includes at least one of a flag pin or an object at a fixed location proximal to the target destination location at the playing surface.

12. A method for a golf system including a computing device associated with a user at a physical playing surface having at least one landmark object, the method comprising:

obtaining topography data representing playing surface characteristics between a virtual golf hole and a virtual golf ball;

determining a plurality of ball placement locations respectively suitable for representing the virtual golf ball on the physical playing surface based on a combination of the topography data and an anticipated virtual golf ball trajectory, the anticipated virtual golf ball trajectory emulating, on the physical playing surface, the virtual golf hole; and generating signals for communicating a selected ball placement location from the plurality of determined ball placement locations to emulate, on the playing surface, the golf ball trajectory to a target destination location.

13. The method of claim 12, wherein the playing surface includes the plurality of ball placement locations respectively associated with a landmark object, and wherein determining the selected ball placement location includes:

identifying a subset of ball placement locations on the playing surface as a suitable ball placement location based on the combination of the topography data and the anticipated virtual golf ball trajectory; and determining the selected ball placement location from the subset of ball placement locations.

14. The method of claim 13, wherein the selected ball placement location is based on optimizing at least one of: a number of golf users playing a golf ball at respective destination locations on the playing surface, playing surface wear pattern, or flow of golf users into and away from the playing surface.

15. The method of claim 12, wherein generating signals for communicating the selected ball placement location and an associated target destination location on the playing surface includes:

displaying a direction interface element for overlaying on image data including a landmark object proximal to the target destination location for guiding the user to the ball placement location, the direction interface element generated based on anchor data associated with the landmark object and a current user location.

16. The method of claim 15, wherein the direction interface element is based on a polar coordinate system providing annular direction centered about the landmark object and a displacement direction in a radial direction based on the landmark object.

17. The method of claim 15, wherein the overlay of the direction interface element atop the substantially real-time image feed at the computing device provides an augmented reality view of the playing surface as the user traverses the playing surface.

18. The method of claim 15, wherein generating signals for communicating the selected ball placement location and the associated target destination location on the playing surface includes:

in response to obtaining an updated user location relative to the landmark object, display an updated interface element to provide subsequent direction towards the selected ball placement location.

19. The method of claim 15, wherein the current user location is based on at least one of a location of the computing device being proximal to the user or a location of a tracking device wearable by the user.

20. A non-transitory computer-readable medium or media having stored thereon machine interpretable instructions which, when executed by a processor, cause the processor to perform a computer-implemented method for a golf system, the golf system including a computing device associated with a user at a physical playing surface having at least one landmark object, the method comprising:
- obtaining topography data representing playing surface characteristics between a virtual golf hole and a virtual golf ball;
- determining a plurality of ball placement locations respectively suitable for representing the virtual golf ball on the physical playing surface based on a combination of the topography data and an anticipated virtual golf ball trajectory, the anticipated virtual golf ball trajectory emulating, on the physical playing surface, the virtual golf hole; and
- generating signals for communicating a selected ball placement location from the plurality of determined ball placement locations to emulate, on the playing surface, the golf ball trajectory to a target destination location.

* * * * *